US006777940B2

(12) United States Patent
Macune

(10) Patent No.: US 6,777,940 B2
(45) Date of Patent: Aug. 17, 2004

(54) APPARATUS AND METHOD FOR RESISTIVITY WELL LOGGING

(75) Inventor: Don T. Macune, Houston, TX (US)

(73) Assignee: Ultima Labs, Inc., Houston, TX (US)

( * ) Notice: Subject to any disclaimer, the term of this patent is extended or adjusted under 35 U.S.C. 154(b) by 0 days.

(21) Appl. No.: 10/291,440

(22) Filed: Nov. 8, 2002

(65) Prior Publication Data

US 2004/0090234 A1 May 13, 2004

(51) Int. Cl.[7] .............................. G01V 3/30; G01V 3/18
(52) U.S. Cl. ..................................... 324/338; 324/335
(58) Field of Search ................................ 324/334–343; 702/7

(56) References Cited

U.S. PATENT DOCUMENTS

| | | | | |
|---|---|---|---|---|
| 5,278,507 A | * | 1/1994 | Bartel et al. ................. | 324/338 |
| 5,452,761 A | * | 9/1995 | Beard et al. ................. | 324/323 |
| 5,650,726 A | * | 7/1997 | Gasnier et al. .............. | 324/339 |
| 5,869,968 A | * | 2/1999 | Brooks et al. ............... | 324/338 |
| 6,218,841 B1 | * | 4/2001 | Wu ............................. | 324/338 |
| 6,218,842 B1 | * | 4/2001 | Bittar et al. ................. | 324/339 |
| 6,476,609 B1 | * | 11/2002 | Bittar ........................... | 324/338 |
| 6,646,441 B2 | * | 11/2003 | Thompson et al. .......... | 324/338 |
| 6,703,837 B1 | * | 3/2004 | Wisler et al. ................ | 324/338 |

* cited by examiner

*Primary Examiner*—N. Le
*Assistant Examiner*—Darrell Kinder
(74) *Attorney, Agent, or Firm*—Dominque & Waddell, PLC

(57) ABSTRACT

Well logging apparatus and methods for determining formation resistivity at multiple (>3) depths of investigation. At least one transmitter antenna and at least two receiver antennas are mounted in a logging tool housing, on substantially a common axis. The antennas are untuned coils of wire. Electromagnetic energy is emitted at multiple frequencies from the transmitter into the formation. The receiver antennas, which are spaced apart from each other and from the transmitter, detect reflected electromagnetic energy. Formation resistivity at multiple depths of investigation is determined using only phase differences in the reflected energy at the different frequencies, minimizing false indications of invasion due to mismatch of vertical response with attenuation measurements and also permitting correcting for the effects of varying dielectric constant of the formation. The apparatus minimizes the number of antennas, electronics complexity, required power, and measurement time required to determine resistivity at multiple depths of investigation.

49 Claims, 14 Drawing Sheets

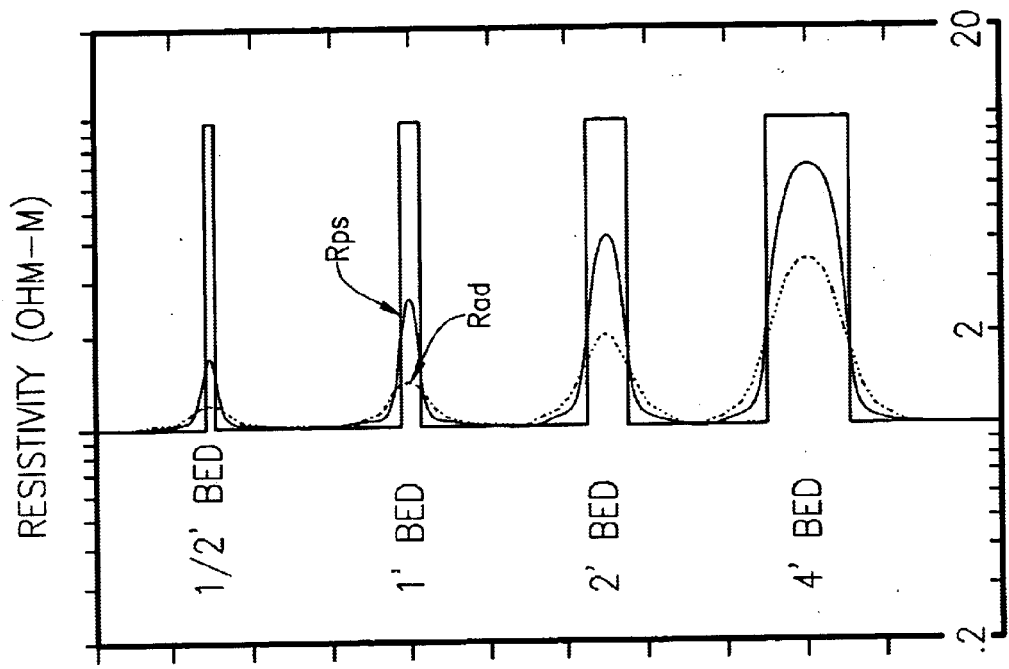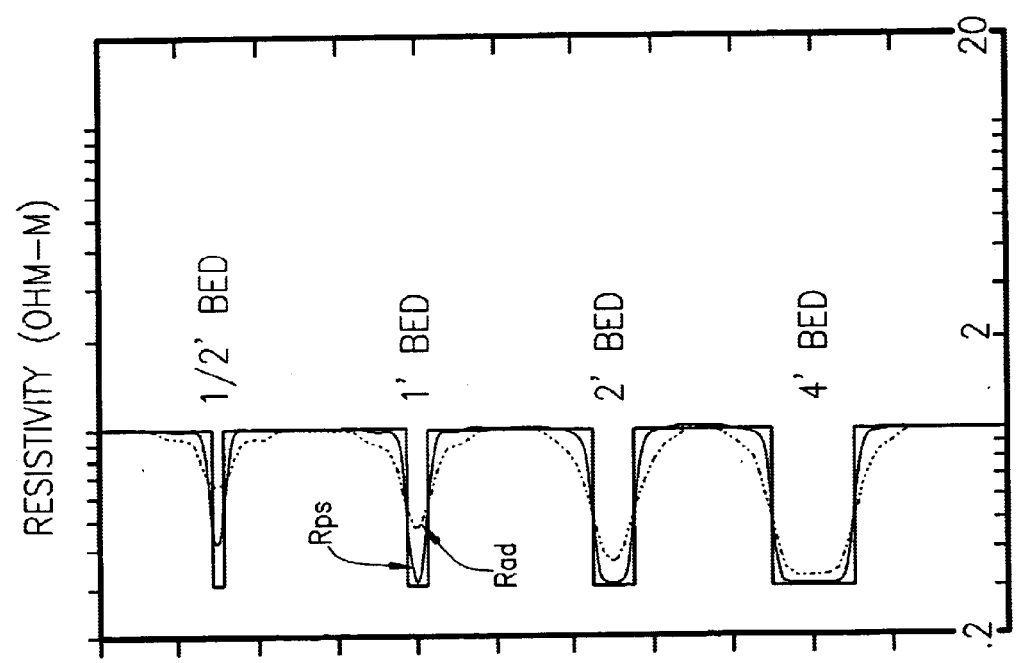
Fig. 6

APPARATUS AND METHOD FOR RESISTIVITY WELL LOGGING

BACKGROUND

1. Field of the Invention

This invention relates to the field of electric logging of "wells" or earthen boreholes. In particular, the invention relates to well logging apparatus and methods for determining formation properties, such as resistivity, at several different distances extending radially from the borehole into the surrounding formation. The invention has general applications in the well logging art, but is particularly useful in measurement while drilling ("MWD") applications.

2. Description of the Related Art

Resistivity logging is a commonly used technique for evaluating potential hydrocarbon-bearing formations surrounding a borehole drilled into the earth. Porous formations are more resistive to a flow of electric current when they are saturated with hydrocarbons, and less resistive when saturated with water (which contains some amount of salt, rendering it more or less conductive). The formation immediately surrounding the borehole can be altered by invasion of borehole fluids during the drilling of the well, and can therefore exhibit a different resistivity than the formation farther from the borehole—so-called "virgin" formation. In order to determine the true resistivity of the virgin zone, the well logging device must be capable of performing measurements at multiple depths of investigation. The multiple depths permit mathematical correction of the different measured values.

Historically, resistivity logging tools, conveyed by wireline after the borehole has been drilled, have measured resistivity at three depths of investigation (shallow, medium, and deep). Mathematically, the three measurements are used to solve for three unknowns (Rt, Rxo, and Di). The shallow and medium measurements are used to correct the deep measurements to obtain a more accurate measurement of true virgin resistivity (Rt). The medium and deep readings are used to correct the shallow reading to obtain a more accurate reading of flushed zone resistivity (Rxo) (the flushed zone being the formation nearest the borehole, in which the original formation fluids have been at least partially displaced by drilling fluids). The three readings are also used to determine the depth of invasion Di (that is, how far drilling fluids have intruded into the formation), when a simple step invasion profile is assumed.

Large values for depth of invasion indicate zones of high permeability, which suggest potential high fluid flow rates, desirable for producing commercially significant quantities of hydrocarbons. Computed values for Rt and Rxo may be used for estimating water saturation (Sw), under certain favorable conditions. Low values of Sw indicate the presence of hydrocarbons in the formation.

The present invention relates to a type of resistivity well logging known as electromagnetic propagation logging. Propagation logging is well suited for determining resistivity by apparatus designed for use while drilling, so-called MWD tools. The basic principle of such measurement is a transmitter propagating electromagnetic energy into the formation, at a known frequency and strength, and reflections of that transmitted energy are detected by receivers spaced apart from the transmitter. Earlier generation MWD propagation resistivity devices provided only two depths of investigation, from the phase difference and attenuation measurements. By "phase difference" is meant a difference in timing between the transmitted and received signal. By "attenuation" is meant a lessening or decrease in the amplitude of the transmitted signal.

Separation of the curves is used to identify invasion; however, it is mathematically impossible to solve for the three desired unknowns (Rt, Rxo, Di) from only two measurements. Another disadvantage of the earlier generation tools is that the vertical response of the attenuation measurement is not as sharp as the vertical response of the phase difference measurement. As a result, separation of the curves results at bed boundaries (that is, the boundaries between beds of dissimilar rock type within a zone), even when invasion is not present. Also, it is known in the art that dielectric uncertainty can cause the phase difference and attenuation curves to separate even when no fluid invasion is present. In fact, the separation of phase difference and attenuation curves can be used to estimate the dielectric constant in thick beds.

Another disadvantage of the attenuation measurement is reduced dynamic range when compared to the phase difference measurement. As the formation resistivity increases, the attenuation measured between the two receiver antennas approaches a constant value, and the measurement becomes insensitive to changes in resistivity. In contrast, the phase difference measurement retains sensitivity to higher resistivity values and thus has a broader useful range. The limited dynamic range of the attenuation measurement sets an upper resistivity limit on the utility of apparatus employing this method for detecting invasion.

More recent propagation MWD resistivity devices have added measurements at additional depths of investigation. However, these prior art apparatus and method still have various limitations. One group of apparatus achieves the multiple depth resistivity measurements via additional transmitter and receiver antennas, each tuned to transmit or receive at the same frequency but spaced differently, thereby resulting in different depths of investigation. The additional transmitters and receivers, it will be appreciated, added greatly to cost and complexity of the tools.

Yet another group of apparatus employed multiple different frequencies to yield multiple depths of investigation (it being known in the art that different frequencies yield different depths of investigation, the lower frequencies yielding a deeper investigation, while higher frequencies yield a shallower depth of investigation). However, this group of tools still required multiple additional transmitters and receivers, each tuned to transmit or receive only a single frequency. Again, increased cost and complexity of tools resulted. Many of these prior art apparatus exhibit other limitations, such as high electrical power consumption.

The apparatus and method of the present invention provide resistivity measurements at multiple (three or more) depths of investigation while avoiding the disadvantages of related art methods and apparatus. The apparatus and method herein provide multiple resistivity measurements that have nearly equivalent vertical resolution and maximum dynamic range, by using only phase difference measurements. Since attenuation measurements are not used for additional depths of investigation, the attenuation measurements can be combined with the phase difference measurements to solve for the formation dielectric constant at multiple frequencies. The current apparatus minimizes the number of antennas required for either a borehole compensated and electronically compensated measurement (four), or alternatively for an uncompensated measurement (three), as a result minimizing manufacturing and maintenance cost and maximizing reliability. Furthermore, untuned coils are used for the transmitter and receiver antennas, allowing each coil to be used for more than one frequency and eliminating error caused by mutual inductance between adjacent series tuned receiver antennas. The apparatus minimizes electronics required to transmit multiple frequencies by using a switch-mode transmitter circuit, which has the further advantage of generating the desired frequencies simultaneously. The transmitter electronics disclosed are also simpler and more efficient than methods used in the prior art. Transmitter energy is minimized by using low noise electronics and coherent detection in the receiver. Time required to complete a measurement can be minimized by simultaneously detecting multiple frequencies in the receiver.

OBJECTS AND ADVANTAGES

Accordingly one of the objects of this invention is to provide resistivity measurements of a formation surrounding a borehole at multiple (three or more) depths of investigation into the formation. The advantage of this invention is that the additional measurements can be used to compute true or virgin formation resistivity, flushed zone resistivity, depth of investigation, and additional parameters useful in evaluating the economic potential of an oil or gas well.

Another object is to provide measurements at multiple depths of investigation with nearly equivalent vertical response and maximum dynamic range. The advantage is that differences of the measurements caused by mismatched vertical resolution and limited dynamic range are minimized, further minimizing false indications of invasion and error in determination of true formation resistivity.

Another object is to provide an estimate of formation dielectric constant by using the attenuation measurement in combination with the phase difference measurement at each frequency to determine both formation resistivity and dielectric constant. The advantage is that more accurate corrections for variations in dielectric constant can be applied to the resistivity data.

Another object is to minimize the number of transmitting and receiving antennas required for measurements at multiple depths of investigation. The advantage is that the device will have lower manufacturing and operating cost and greater reliability than prior art devices.

Another object is to use untuned coils for both the receiver and transmitter antennas. The advantage is that untuned coils are less expensive to build and maintain and are more reliable. A further advantage is that untuned coils can be used to transmit or receive multiple frequencies, unlike prior art devices, which require separate coils for each measurement frequency. Another advantage is that untuned receiver antennas do not suffer from errors caused by circulating currents in series-tuned receiver antennas.

Another object is to minimize the complexity and maximize the efficiency of electronics used to drive the transmitter antennas at multiple frequencies. The advantage is that manufacturing and maintenance costs will be reduced, reliability increased, and power consumption minimized, increasing battery life or allowing a smaller power source to be used.

Another object is to transmit and detect multiple frequencies simultaneously. The advantage is that the total time required for measurements of multiple depths of investigation is minimized compared to prior art devices and methods.

Another object is to minimize the required transmitter energy and maximize the dynamic range of the measurements by using low noise electronics and coherent detection. The advantage is that the reduced transmitter energy results in longer battery life or allows smaller power sources to be used, without compromising the accuracy and resolution of the measurements.

Further objects and advantages will become apparent from consideration of the drawings and ensuing description thereof.

SUMMARY OF THE INVENTION

The present invention is directed to a well logging apparatus having features that are responsive to a number of needs of the prior art, as discussed above. Most of the features of the invention as set forth herein generally have application to both wireline logging and measurement while drilling. However, some of the features hereof are particularly advantageous for use in a measuring while drilling apparatus.

In accordance with a feature of the invention, there is provided an apparatus and method for investigating earth formations in which resistivity is determined at three or more depths of investigation radially into the formation while using signals transmitted from either a single transmitter antenna or a pair of transmitter antennas placed symmetrically around a pair of receiving antennas. In an embodiment of this form of the invention using a single transmitter antenna, electromagnetic energy is transmitted at a first location in the borehole (the active transmitter antenna) and received at a second and third location (the receiving antenna pair). In an embodiment with two transmitter antennas, electromagnetic energy is also transmitted from a fourth location in the borehole and received at the second and third locations, following transmission from the first location. The measurements of the received signals from both transmissions are optionally combined to cancel errors resulting from the borehole or imbalance in the electronics.

The electromagnetic energy is transmitted at a fundamental frequency and also at harmonics of the fundamental frequency. The receivers at the second and third location determine the phase difference between the two receiving locations, at each frequency of interest. The formation resistivity at the deepest depth of investigation is determined from the phase difference measurement of the fundamental (lowest) frequency. The resistivity of the formation closer to the borehole is determined from the phase difference of the higher frequency harmonics. As the frequency increases, the measurement distance away from the borehole decreases. By using multiple frequencies, with each antenna capable of transmitting and receiving multiple frequencies, the total number of antennas required to obtain measurements at multiple depths of investigation is minimized.

The attenuation of the electromagnetic energy between the second and third location at each frequency is also determined, and is combined with the phase difference measurements at each frequency to simultaneously determine the formation dielectric constant as well as a dielectric-corrected resistivity. The vertical response of the phase difference measurements are well matched, so that they may be easily combined to evaluate the invasion profile of borehole fluids into the formation and determine true resistivity, flushed zone resistivity, and depth of invasion. Also, the phase difference measurements have a wider usable dynamic range than the attenuation measurements.

In accordance with another feature of the invention, there is provided an apparatus and method wherein all of the antennas are simple, untuned coils of wire. The elimination of tuning allows each antenna to be used at multiple frequencies, eliminating the need for individually tuned antenna coils for each frequency. Minimizing the number of antenna coils lowers manufacturing and maintenance cost, and improves reliability. The elimination of tuning also eliminates mutual coupling of magnetic fields in the closely spaced receiver coils due to circulating currents in low impedance series tuned antenna coils.

In accordance with another feature of the invention, there is provided an apparatus and method wherein the electronics used to drive the transmitter antennas consist of a simple switchmode amplifier topology driven by a derivative of the system clock. The pulsating waveform used to drive the transmitter antenna contains energy at the fundamental frequency and also at higher harmonics of the fundamental frequency. The pulsating waveform provides a simple, convenient method for generating the additional frequencies of interest. Switchmode operation of the electronics delivers high efficiency with minimal power dissipation and self heating in the electronics components.

In accordance with another feature of the invention, there is provided an apparatus and method wherein the receiver is capable of detecting multiple frequencies simultaneously. The signals received by the receiver antennas and amplified with a low noise RF amplifier are digitized directly and processed to extract the phase and amplitude information at each frequency of interest. The RF amplifier includes filtering to limit the bandwidth of the signal to be digitized, in order to prevent aliasing of noise into the measurement. The anti-aliasing filters insure good performance in conditions of low received signal to noise ratio, and allow less energy to be used to drive the transmitter. Detecting multiple frequencies simultaneously results in the shortest possible measurement time.

In accordance with another feature of the invention, there is provided an apparatus and method wherein transmitter energy is minimized by using low noise receiver electronics and coherent detection.

BRIEF DESCRIPTION OF THE DRAWINGS

FIG. 6 compares the vertical resolution of the phase difference measurement vs. the attenuation measurement for 2 MHz.

DESCRIPTION OF THE PRESENTLY PREFERRED EMBODIMENTS

Overview of MWD System

Figure 1:
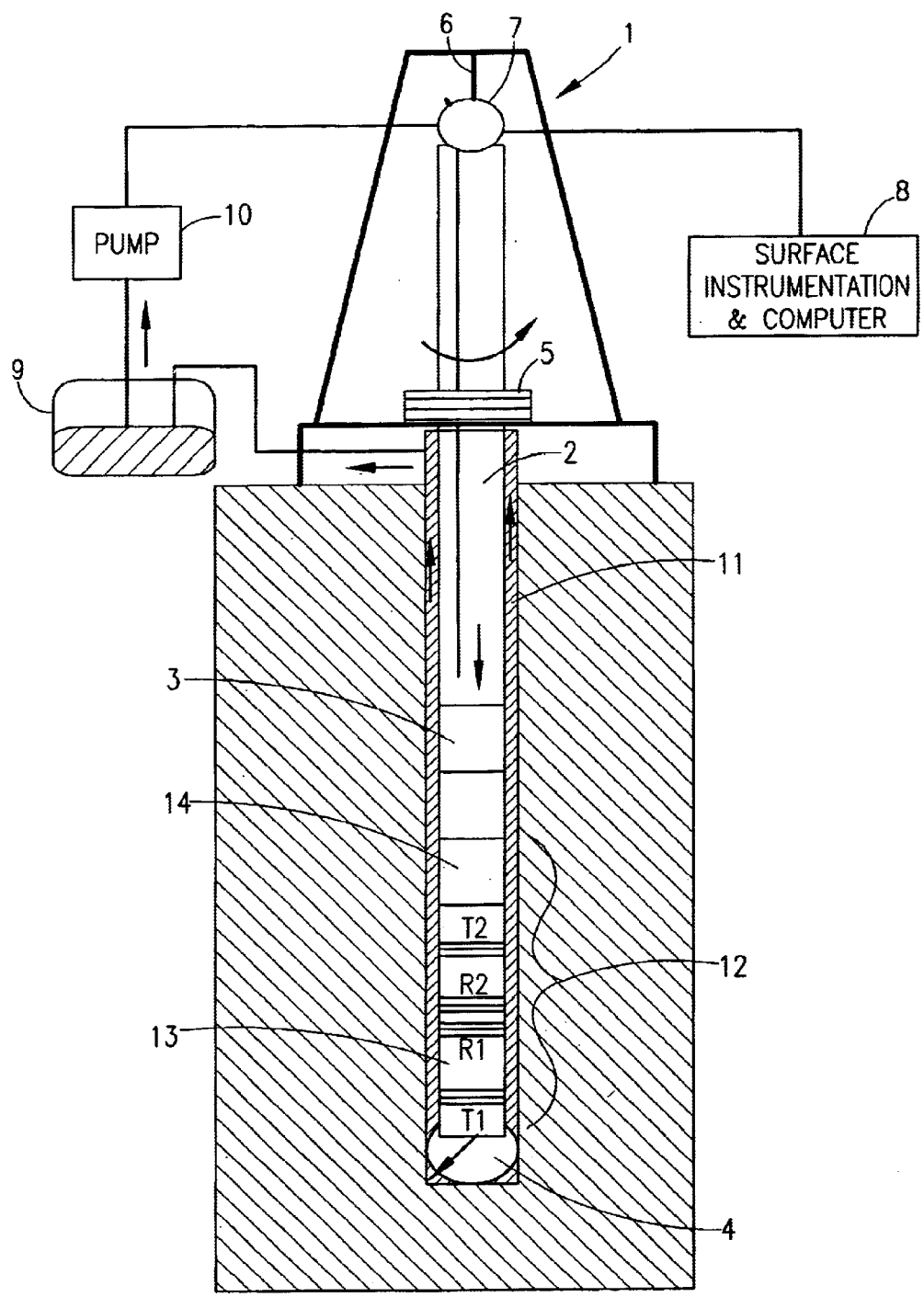
FIG. 1 is a diagram of a drilling rig and drill string including a measurement while drilling system in which an embodiment of the invention can be employed.

FIG. 1 illustrates an embodiment of the invention in the form of an MWD or logging-while-drilling apparatus and method. A drilling rig (1) is located over a borehole formed in the earth by rotary drilling. A drill string is suspended within the borehole and typically includes drill pipe from the surface (2), one or more drill collars (3), a mud motor (optionally), and a drill bit (4) at its lower end. During rotary drilling, the drill string and drill bit attached thereto are rotated by a rotating table (5), which engages a kelly at the upper end of the drill string. The drill string is suspended from a hook (6) attached to a traveling block (not shown). The kelly is connected to the hook through a rotary swivel (7) which permits rotation of the drill string relative to the hook. Sensors and associated instrumentation (8) monitor movement and load of the hook and/or kelly in order to generate a record of depth of the drill bit vs. time. This instrumentation is commonly referred to as the drill string depth system.

Drilling fluid or mud is contained in a pit (9) and is pumped by a mud pump 10 into the bore of the drill string via a port in the swivel to flow downward through the center of the drill string. Additional sensors and associated instrumentation are present which monitor the circulating mud pressure at the top of the drill string. The drilling fluid exits the bore of the drill string via ports in the drill bit and circulates upward in the annulus (11) between the outside of the drill string and the borehole wall. The resulting circulating pressure in the mud column at the top of the drill string is proportional to the resistance to flow encountered by the mud as it circulates. The drilling fluid provides lubrication for the bit while drilling and flushes formation cuttings to the surface, where the fluid returns to the pit for recirculation. The arrows in FIG. 1 illustrate the direction of flow of the drilling fluid.

When a mud motor is present in the bottom hole assembly, the flow of drilling mud through the bore of the drill string turns the mud motor, which in turn rotates the drill bit. In this mode of operation, the borehole may be lengthened by sliding the drill pipe into the borehole while the mud motor rotates the drill bit. Typically a specialized drill collar known as a bent sub is included above the drill bit. The bent sub causes the drill bit to turn slightly away from a straight path, allowing a curved borehole to be created. The direction of the borehole is controlled by orienting the bent sub via the drill string from the surface. If the entire bottom hole assembly is rotated from the surface, it is still possible to drill a straight hole. By a combination of rotary drilling and sliding, the trajectory of the borehole can be accurately controlled.

Mounted within the drill string, preferably near the drill bit, are the. components of the MWD system. These components include means for sensing various directional, geophysical, mechanical, or other parameters of interest, processing the outputs of the sensors, storing the data, and transmitting data of interest to the surface. MWD subsystem (12) includes a measuring apparatus (13) which comprises antennas T1, R1, and R2.

A transmitting portion (14) of the downhole subsystem includes a controllable valve in the bore of the drill string.

Closing of the valve creates increased resistance to flow of the drilling mud, resulting in a measurable increase in pressure at the top of the bore of the drill string at the surface. Opening of the valve results in a measurable decrease in pressure. By opening and closing the valve, a serial bit stream of digital data can be transmitted to the surface and recovered by monitoring corresponding variations in pressure at the top of the drill string. Other techniques for transmitting digital data by modulating the mud pressure measured at the surface are also in use. Another technique for transmitting digital data to the surface relies on transmission of low frequency electromagnetic energy from the MWD transmitter through the formation to a receiving antenna at the surface. The computer at the surface (8) typically combines the mud pulse or electromagnetic telemetry data recovered from the downhole transmitter with the drill bit depth system output to create a real time log of sensor data versus depth. The telemetry system may also include the capability of receiving commands from the surface.

All presently available methods for transmitting digital data to the surface are limited in their capacity such that only a subset of the data of interest may be transmitted in real time. Additional data is typically stored downhole in a downhole memory subsystem. The downhole memory subsystem includes a clock which has been previously synchronized with the clock at the surface used to track drill bit depth vs. time. Each set of sensor data stored downhole is saved with the time it was acquired, creating a file of sensor data vs. time. When the MWD assembly returns to the surface, the memory file is downloaded from the MWD tool and combined with the surface file of drill bit depth vs. time to create a log of sensor data versus depth. Additional processing or corrections may be applied to the sensor data at the surface. There may be a single memory subsystem serving multiple sensors, or each sensor may have its own internal memory for storage of sensor data vs. time.

An additional subsystem of the measurement while drilling system provides electrical power to the sensors and telemetry data transmitter. The power subsystem may consist of a turbine in the bore of the drill collar with alternator wherein electrical power is created from rotation of the turbine by circulation of drilling fluid. The turbine—alternator system provides power only when mud is circulating. Instead of a turbine with alternator, a high temperature battery may be used as the primary source of electrical power. The battery can provide only a limited number of hours of operation, but operates independently of mud circulation. Often a turbine-alternator is combined with a battery to provide unlimited flow-on operation with the capability to acquire sensor data when flow is off. An additional subsystem of the measurement while drilling system is the system master. The system master coordinates operation of the sensors with the telemetry data transmitter and data memory subsystem. Each sensor contains an analog to digital conversion system which converts the sensor output to a digital representation. The system master is responsible for transferring the digital data from the sensor to either the telemetry data transmitter or data memory subsystem.

Block Diagram—Antennas and System Electronics

Figure 2:
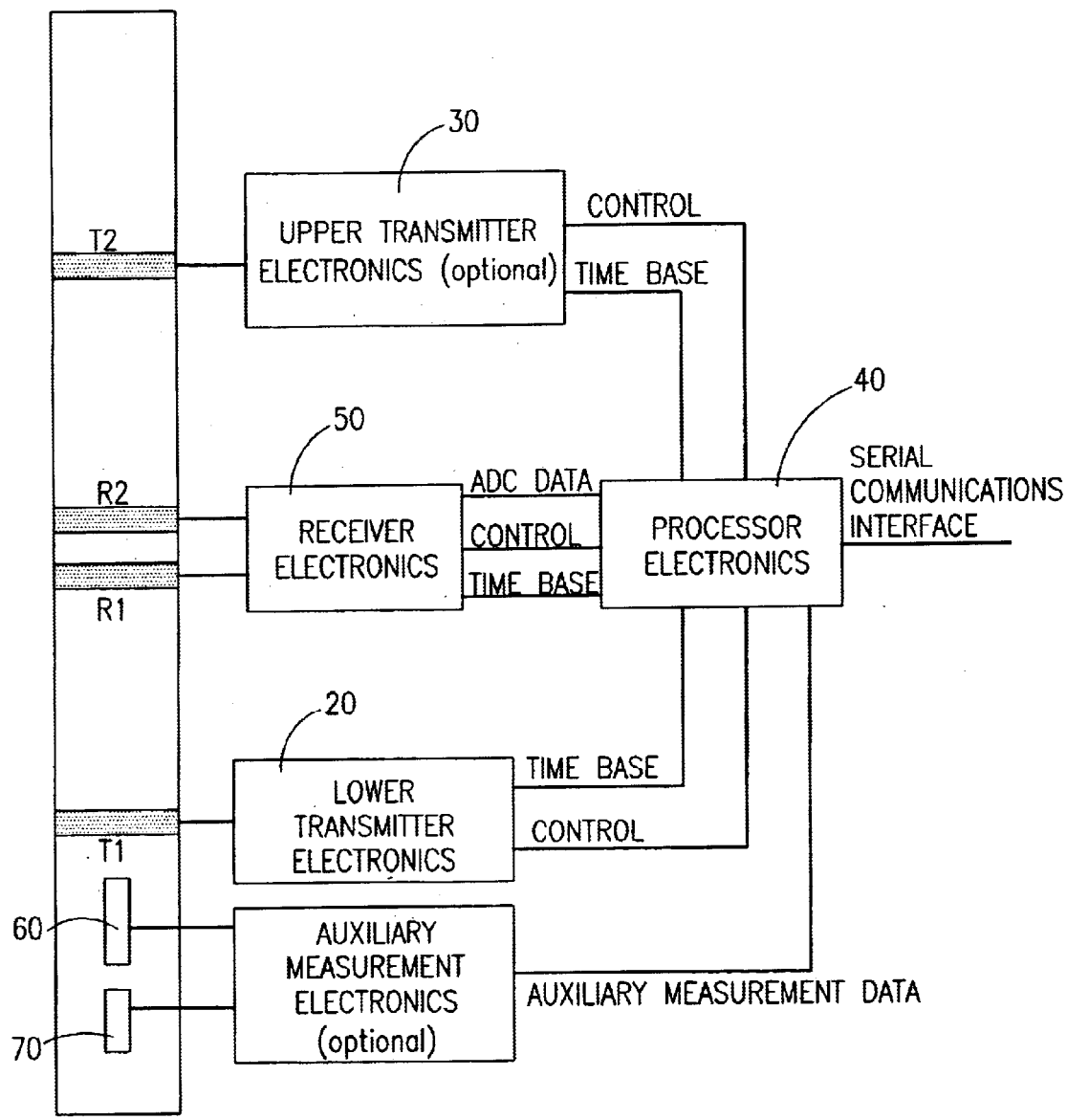
FIG. 2 is a block diagram of the propagation resistivity tool, showing antennas, printed circuit assemblies, and interconnections.

FIG. 2 is a block diagram of the electronics in the measuring apparatus 13 of FIG. 1. FIG. 2 shows lower and upper transmitter antennas T1 and T2, respectively; however, while the ensuing description includes upper transmitter T2, it is understood that upper transmitter T2 may be omitted in order to minimize the overall length of the device, and that the scope of the invention comprises apparatus with either one or two transmitter antennas. Also, as widely understood from the Reciprocity Theorem for antennas and electromagnetic propagation, the position of transmitter and receiver antennas can be interchanged without affecting the measurement. In an apparatus with two receivers located between two transmitters, the location of transmitters and receivers can be interchanged. In an apparatus with only one transmitter and two receivers, the two receivers can be replaced by two transmitters, and the original single transmitter can be replaced by a single receiver.

With reference to FIG. 2, the electronics required for implementing the resistivity electronics comprise four separate printed circuit assemblies. Interconnections for system power and local power supplies are not shown. Lower and upper transmitter antennas T1 and T2 are driven by a means for generating a multiple frequency electromagnetic energy waveform therefrom, comprising separate transmitter boards 20 and 30, respectively. Transmitter boards 20 and 30 are located physically near transmitter antennas T1 and T2 to minimize crosstalk from the transmitter wiring to the receiver antennas and circuitry. Signals from the processor board 40 provide on/off control and a common time base required for synchronous detection. The time base is typically generated by a crystal oscillator on the processor board. The time base frequency is much higher than the measurement frequencies to minimize crosstalk to the receiver electronics. On the transmitter board(s), the higher frequency time base is divided down to generate the measurement frequencies.

A means for processing reflections of the electromagnetic energy detected by R1 and R2 comprises receiver electronics resident on a single printed circuit board 50. Receiver board 50 is located physically near receiver antennas R1 and R2 to minimize wiring and interconnections required for the small receiver antenna signal. Receiver board 50 amplifies the received RF signal, shifts the frequency of the signal down to the audio range using a local oscillator and mixer, filters the audio frequency signal, and digitizes the signal using analog to digital converters. The digital data output signal is then transferred to processor board 40.

A means for receiving said output signal and determining a phase difference and attenuation therebetween, comprises processor board 40 which determines the relative phase and amplitude of the received signals from the sampled data transferred from receiver board 50. Processor board 40 uses synchronous detection to determine amplitude and phase. Synchronous detection allows the bandwidth of the measurement to be significantly reduced, which improves the overall signal to noise ratio. The higher signal to noise ratio extends the dynamic range and resolution of the measurement without an increase in transmitted power.

Synchronous detection requires that the transmitter, local oscillator, and analog to digital converter all operate from a common time base. The common time base resides on processor board 40. Processor board 40 also provides control of the transmitter boards 30 and 40, selecting either T1 or T2 to be operational in a sequential manner. Processor board 40 can also cause both transmitter boards 20 and 30 to be in a low power "off" state between measurements. Processor board 40 also controls the frequency of the local oscillator on receiver board 50.

Following determination of relative phase and amplitude of both individual received signals, processor board 40 further comprises a means for determining formation resistivity at multiple detected frequencies, by determining the phase difference and attenuation (amplitude ratio) of the two signals. Processor board 40 then converts phase difference and/or attenuation to an equivalent resistivity, or performs additional processing to estimate and correct for error due to dielectric effects of the formation. Processor board 40 also responds to data requests from the MWD system master.

Optional sensors for detection of natural gamma radiation 60 from the formation and measurement of inclination 70 of the drill collar are also shown in FIG. 2. Sensors and electronics required for these measurements are commonly located in probes in the bore of the drill collar. However, the packaging of the electronics and design of the antennas of the resistivity collar allow the sensors and electronics to be located in the resistivity collar. The gamma radiation measurement benefits from increased sensitivity, as there is less steel surrounding the detector to interfere with the measurement. The inclination measurement also benefits in that the inclination sensor can be rigidly mounted to the resistivity collar, and is not subject to the uncertainty in orientation created by mounting of a probe inside the bore of the collar. Total system electronics are minimized by allowing the gamma radiation measurement and inclination measurement to share processing, communications, and power supply electronics with the resistivity measurement. The processor board performs counting of the gamma ray detector pulse output, to determine gamma counts per second. It also calculates inclination and tool face from the measured accelerometer outputs.

Transforms—Phase Difference and Attenuation vs. Resistivity vs. Frequency

Figure 3:
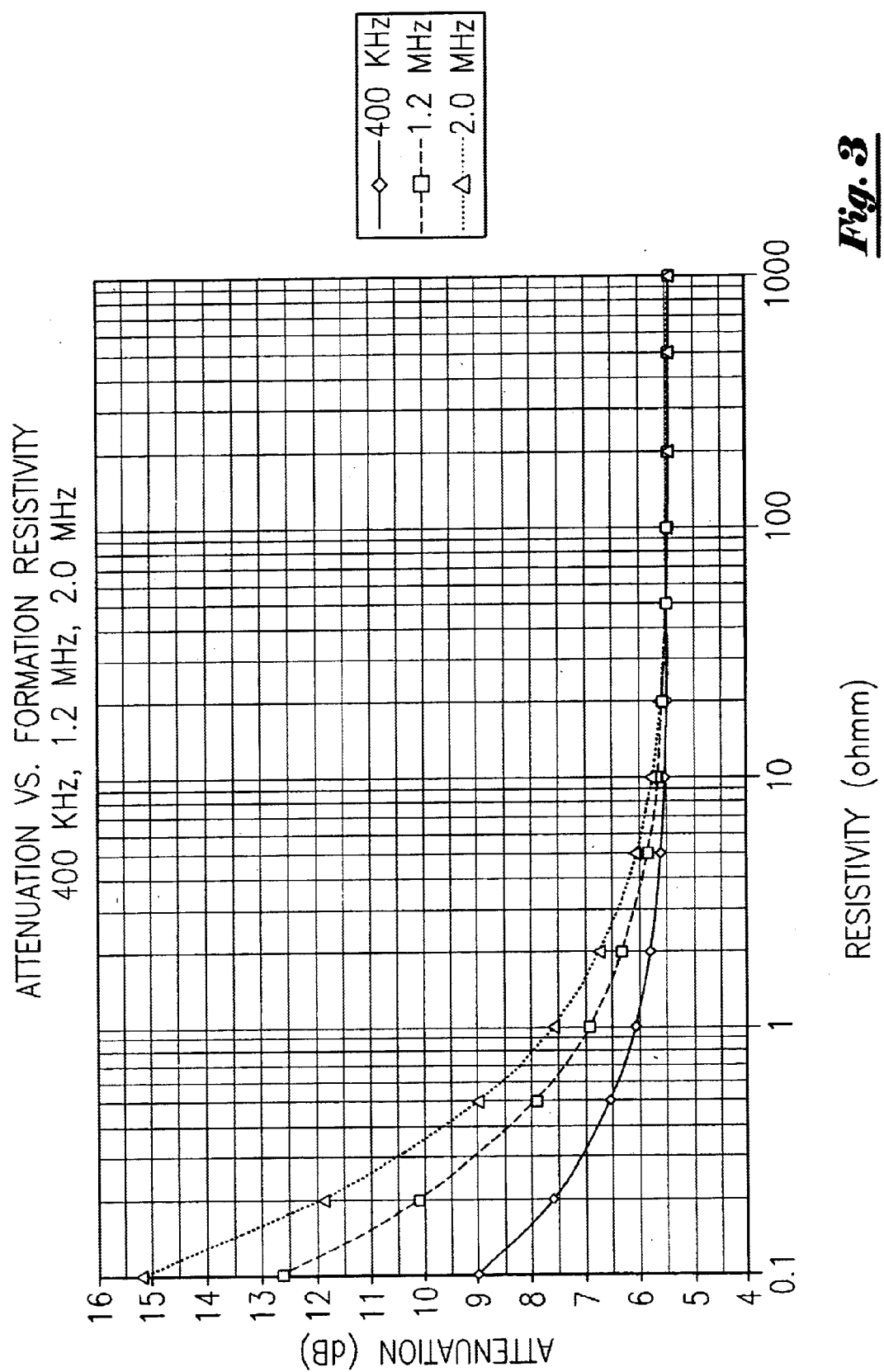
FIG. 3 shows the relationship for attenuation.
Figure 4:
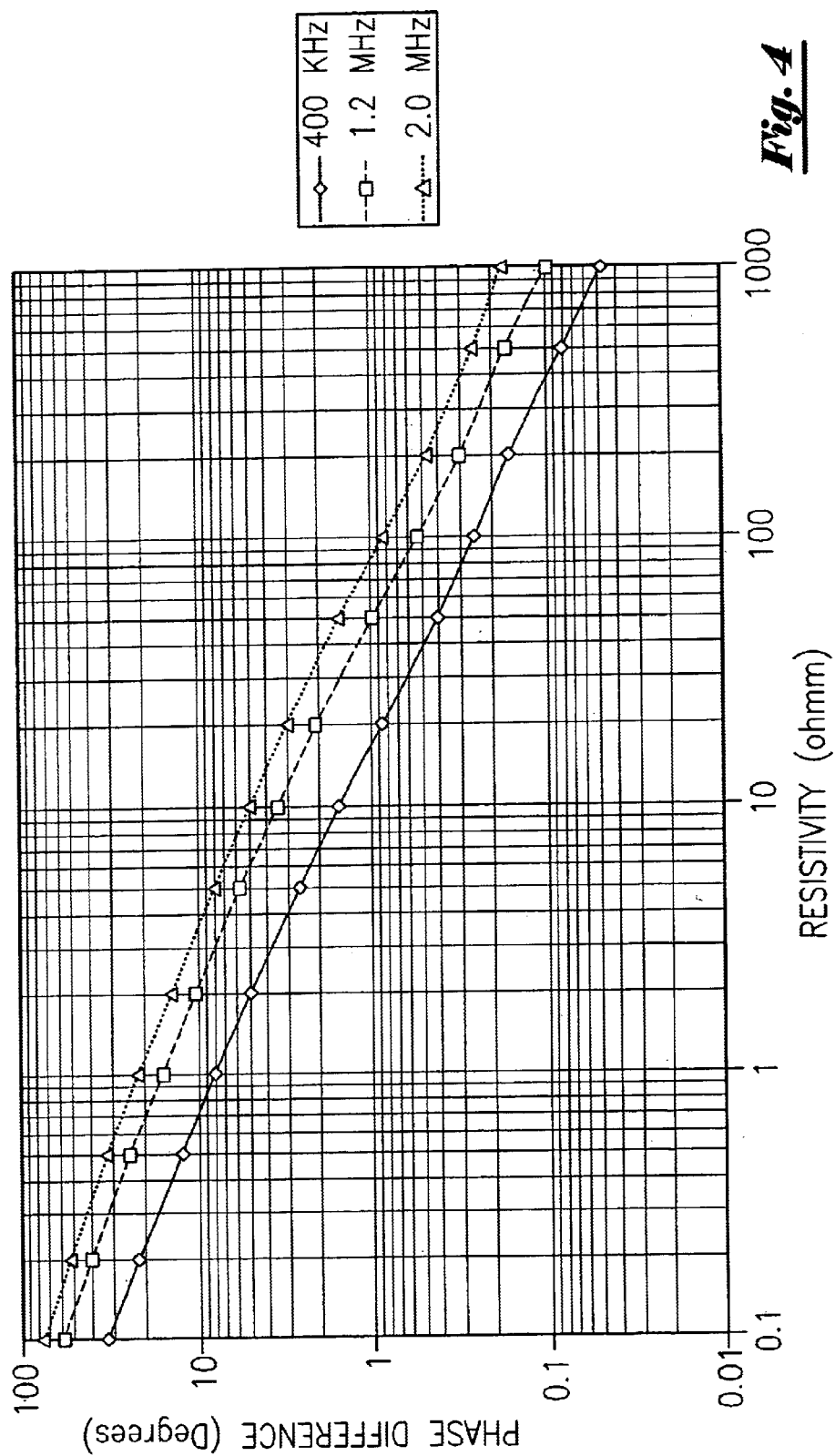
FIG. 4 shows the relationship for phase difference measured between the two receiver antennas vs. resistivity.

For the resistivity measurement, transmitter boards 20 and 30 drive transmitter antennas T1 and T2 with a waveform that contains a fundamental (lowest) frequency and odd harmonics of the fundamental frequency. By way of example only and not limitation, a typical value for the fundamental frequency is 400 KHz, with odd harmonics at 1.2 MHz (3×fundamental frequency) and 2.0 MHz (5×fundamental frequency). The higher frequencies are more sensitive to regions at shallower distances radially from the tool, while the lowest frequency penetrates deepest and is sensitive to regions farthest radially from the tool. The relationship of the measured attenuation of the two received signals (from receiver antennas R1 and R2) to the resistivity of a homogeneous formation (without invasion) for a typical antenna spacing of 24" from transmitter to near receiver (e.g., from T1 to R1) and 30" from transmitter to far receiver (e.g., from T1 to R2) is shown in FIG. 3. The same relationship for the measured phase difference is shown in FIG. 4.

Note that for the attenuation curves shown in FIG. 3, attenuation becomes almost constant for resistivities above 10 ohmm. For the phase difference curves shown in FIG. 4, the measured phase difference decreases with increasing resistance, but remains sensitive to formation resistivity even above 100 ohmm. For both phase difference and attenuation, sensitivity to formation resistance increases with frequency. These graphs (FIGS. 3 and 4) illustrate the advantage of the phase difference measurement over the attenuation measurement for measuring high values of formation resistance.

Figure 5:
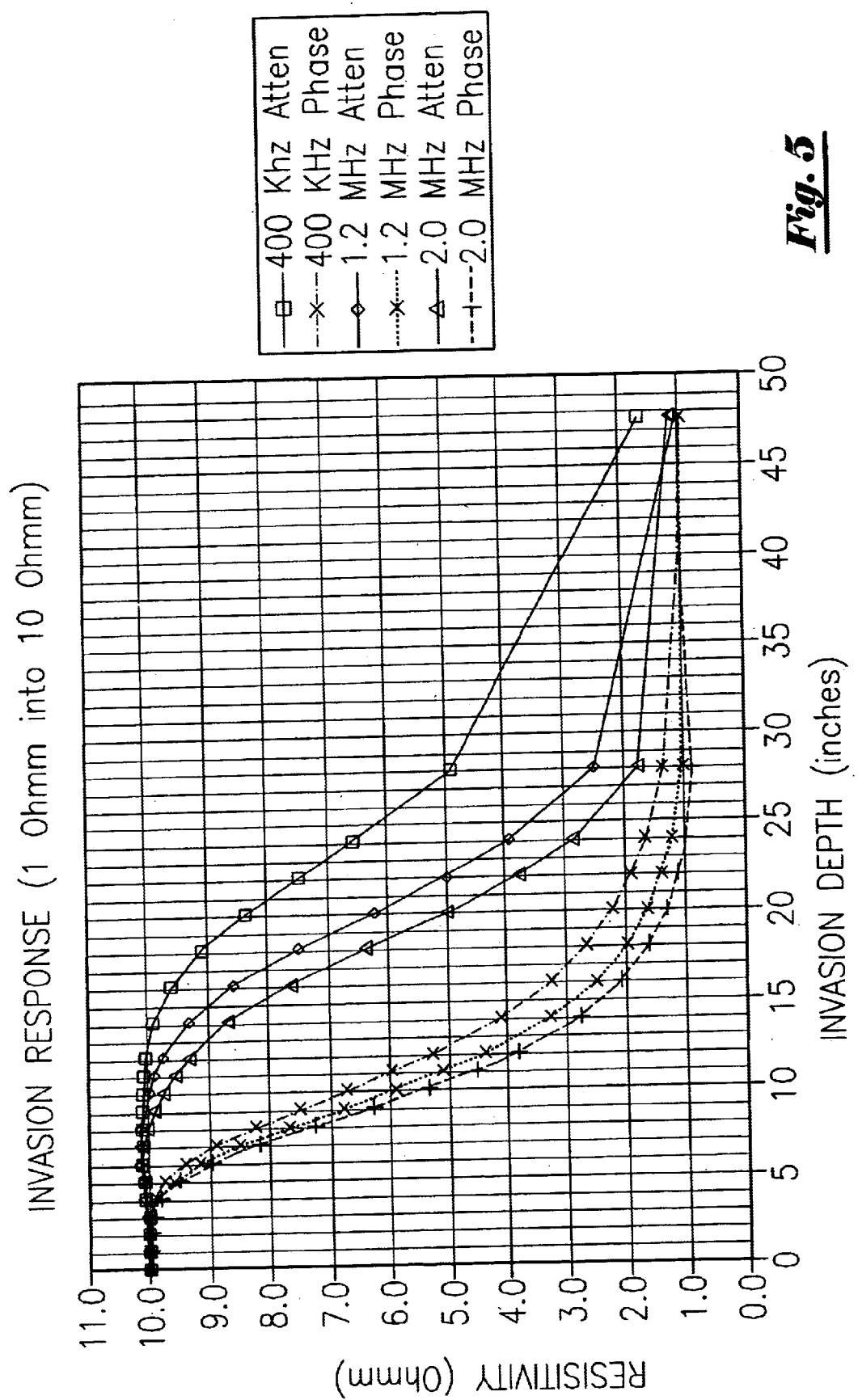
FIG. 5 shows the response of phase and attenuation measurements at three different frequencies to varying depths of invasion.

FIG. 5 illustrates the response of the phase difference and attenuation measurements to invasion. This figure assumes a 10 ohmm resistivity for the virgin formation far from the borehole, with a 1 ohmm invaded zone. For no invasion (invasion depth=0 in.), all measurements read 10 ohmm. As the invasion depth increases from zero, the phase difference measurements respond initially. As the invasion depth exceeds 10", the attenuation measurements are also affected. The curves verify that the phase difference measurements are more sensitive to shallow invasion than the attenuation measurements. Note that at an invasion depth of 10 ohmm, the phase difference curves at the three frequencies are clearly separated. The 2 MHz measurement reads is most affected by the invasion and reads approx. 5.3 ohmm. The 400 KHz measurement is least affected and reads approx. 6.8 ohmm. Using the three distinct readings at three different frequencies, values for virgin resistivity Rt, invaded (or flushed) zone resistivity Rxo, and depth of invasion Di can be determined.

Vertical Resolution—Phase vs. Attenuation

FIG. 6 illustrates the superior vertical resolution of the phase difference-derived resistivity versus the attenuation-derived resistivity, with two different bed arrangements. This data is from Clark, et al. for 2 MHz only. In the upper illustration, thin 10ohmm beds of from ½ to four feet thick are located between adjacent thick 1 ohmm beds. In the lower illustration, thin 0.3 ohmm beds are located between adjacent thick 1 ohmm beds. Note that the phase difference response is much sharper than the attenuation response, and also that the phase difference and attenuation curves separate in the regions immediately adjacent and also within the thin bed. Without a-priori knowledge of the bed boundaries or bed resistivities, the separation of the curves could be falsely interpreted as due to invasion. This illustrates a fundamental limitation of combining the phase difference and attenuation measurements to perform invasion profiling.

Although not shown, the bed boundary response for phase difference measurements which differ only in measurement frequency are very well matched. Nearly equivalent vertical response combined with differing depth of investigation allows the user to determine values for Rt, Rxo, and Di with significantly fewer artifacts created by bed boundaries.

Simultaneous Inversion of Resistivity and Dielectric Constant

Although the attenuation resistivity has several disadvantages when combined with phase difference resistivity for invasion profiling, it is still useful for determination of and correction for the formation dielectric constant. The curves shown in FIGS. 3 and 4 for phase difference and attenuation vs. resistivity assume a constant dielectric constant of 10. However, the dielectric constant of geologic formations is known to vary widely.

Error in estimating the dielectric constant causes the phase difference and attenuation resistivity curves to separate in a homogeneous formation. If the dielectric constant of a formation is higher than expected, the attenuation will be smaller, falsely indicating higher formation resistivity. However, the phase difference will be greater, falsely indicating lower than actual formation resistivity.

If no invasion is present, or if invasion can be detected in some other way (e.g., by using separation of phase difference resistivity curves obtained at different frequendes), the attenuation and phase difference data can be combined to simultaneously solve for both formation resistivity and dielectric constant. The method is limited to thick beds where bed boundary effects do not cause the phase difference and attenuation resistivity curves to separate due to differences in vertical resolution.

Figure 7:
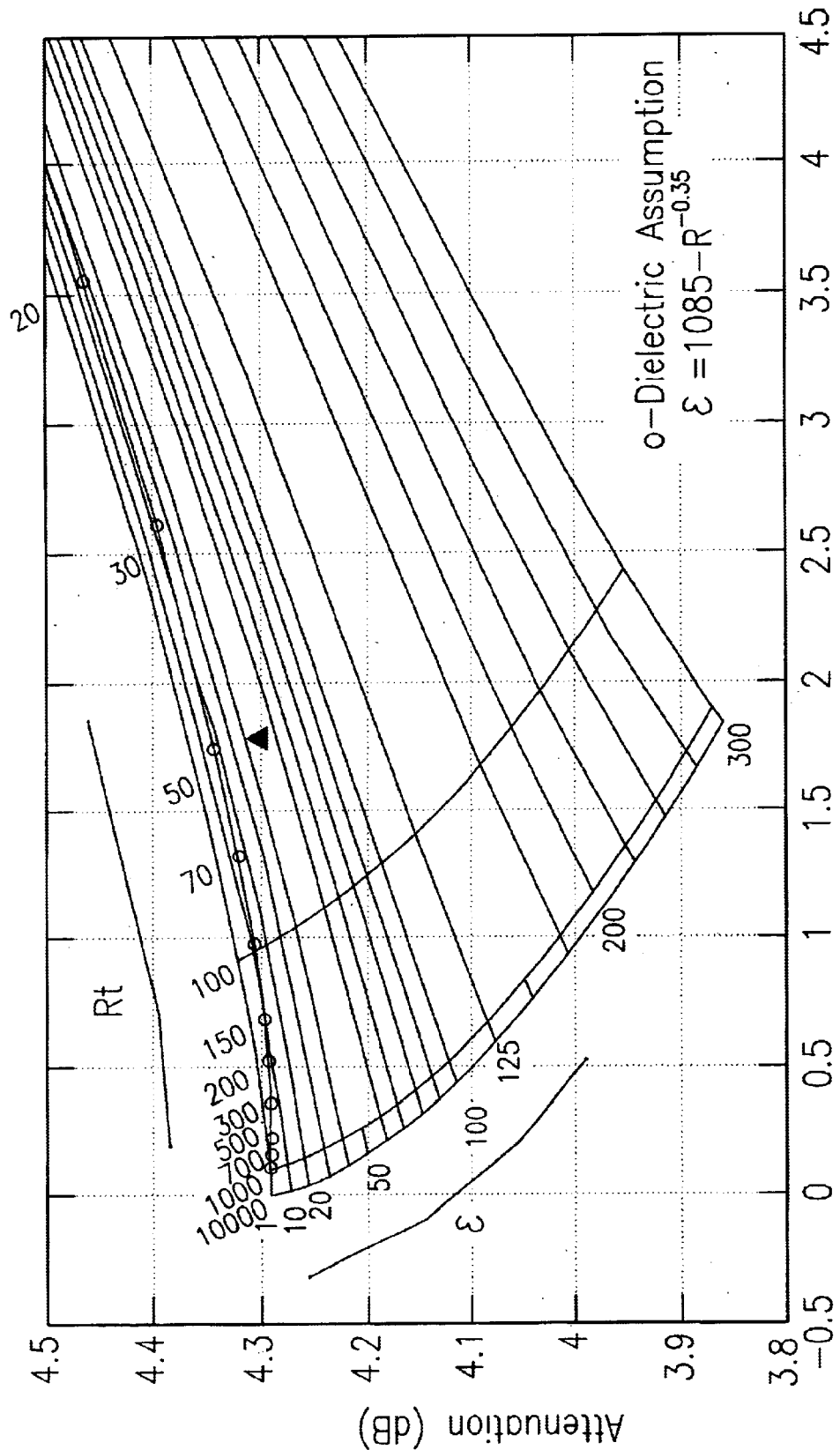
FIG. 7 shows the relationship of phase difference and attenuation under varying conditions of both resistivity and dielectric constant.

FIG. 7 shows a typical data set from Wu, et al for 2 MHz measurement frequency and 34" transmitter-receiver spacing. Phase difference and attenuation are used to locate an (x,y) coordinate on the chart. The curves nearest the (x,y) coordinate provide values for Rt and dielectric constant. The look-up process may be computer automated using a variety of algorithms to provide a continuous estimate of Rt and dielectric constant from log data.

Transmitter Circuit Details

Figure 8:
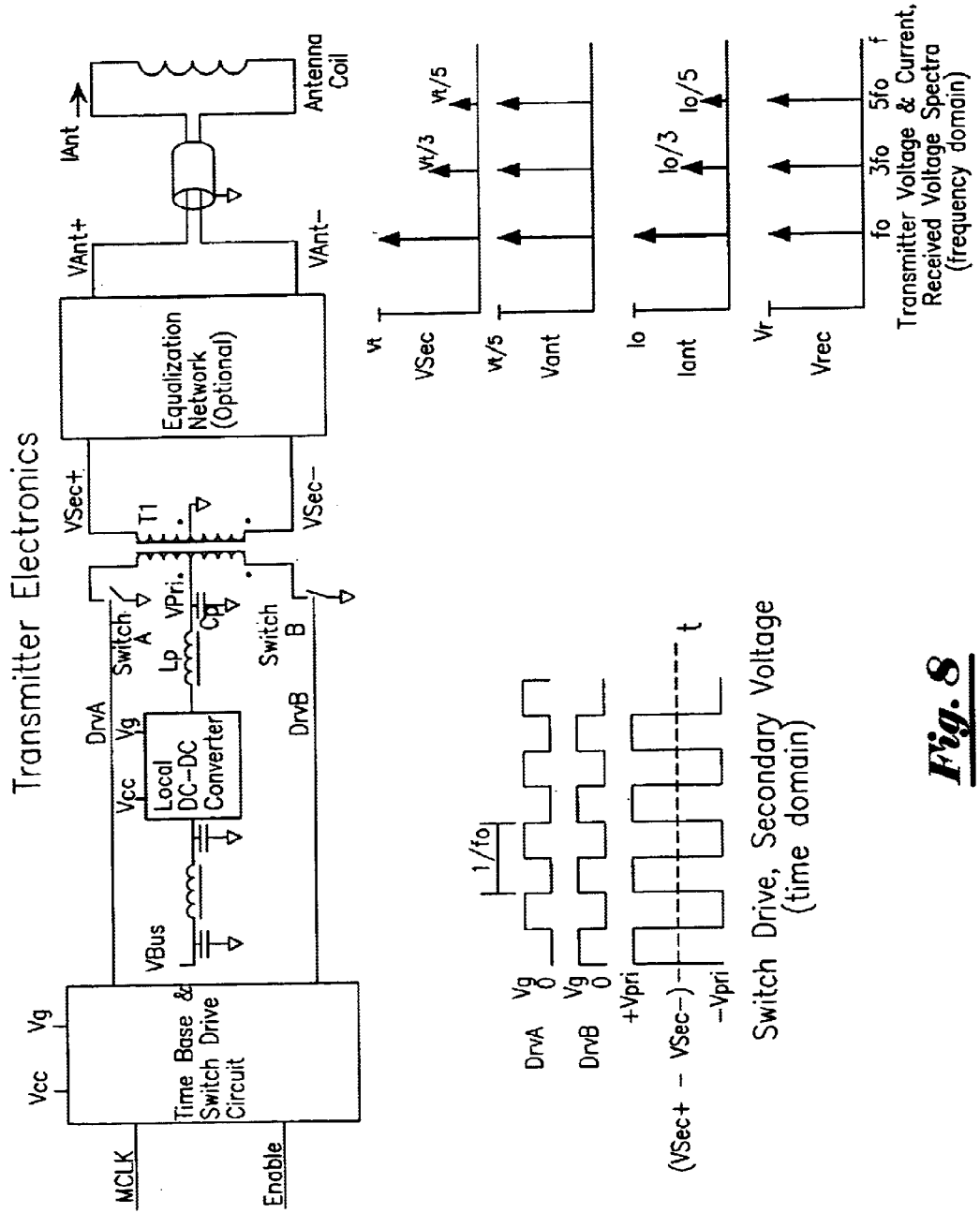
FIG. 8 is the block diagram of the electronics on the transmitter printed circuit assembly.

FIG. 8 shows details of the transmitter electronics circuitry (earlier described as transmitter board 20) and operation thereof. The circuitry is located on an individual printed circuit board (PCB) located in close proximity to transmitter antenna T1 and electrically isolated from the remainder of the measurement electronics. If the tool has two transmitter antennas to realize the benefits of borehole an/or electronics compensation, then a second transmitter PCB (earlier described as transmitter board 30) is located near second transmitter antenna T2.

The inputs to the transmitter PCB are a single power supply voltage (Vbus), a master clock frequency (MCLK) and an Enable signal to turn the transmitter electronics on or off. MCLK and Enable are digital logic levels.

The Vbus power supply voltage (typically 18–48VDC) is converted to other voltages required to power the circuitry on the transmitter PCB. These local power supply voltages are not shared with circuitry on other PC boards in the system, in order to minimize crosstalk through the power supply connections to the receiver circuitry. Vcc powers logic on the transmitter PCB and Vg provides the required voltage for controlling the switching elements The frequency of MCLK is much higher than the measurement frequencies. The higher frequency is divided down to form logic signals DrvA and DrvB. Using a higher frequency for MCLK avoids electrical crosstalk in the measurement frequency bands due to the wiring of the clock signal. The frequency of DrvA and DrvB equals the fundamental, or lowest measurement frequency (which by way of example only may be 400 KHz). The switch drive logic insures that there is a small deadtime when both DrvA and DrvB are low (inactive). This deadtime prevents large current surges through switches A and B that would result if both switches were ever turned on at the same time.

Switches A and B are generally N-channel MOSFET (metal oxide semiconductor field effect transistor) conductor devices. MOSFETs are selected that balance losses due to "on" resistance with losses due to switch drive requirements. The MOSFET must also be rated for the voltage at the connection to T1 when the switch is "off". For N-channel devices, the source is connected to ground and the drive voltage is also referenced to ground, which simplifies circuitry required to create the drive voltages. Also, N-channel devices provide lower "on" resistance for a given input capacitance when compared to P-channel devices, enabling a higher level of efficiency for the overall circuit.

The center tap of the primary of T1 is connected to supply voltage Vpri. Filter component Cp provides AC current at the fundamental frequency. Components T1, Cp, and switches A & B are placed physically very near each other to minimize radiation of undesirable magnetic fields due to current flow between or through these elements. Filter component Lp insures that the AC current is provided by Cp and limits AC current flow in circuit traces between the Local DC-DC Converter and T1.

The secondary voltage of T1 is shown in the FIGURE, with waveforms for DrvA and DrvB. The secondary voltage is a square wave centered about 0V with peak amplitude of Vpri (assuming T1 has a 1:1 turns rato). The center tap of the secondary of T1 is connected to ground, to insure a balanced drive signal at the output of T1 to the antenna. The balanced drive signal minimizes radiation from the transmitter wiring that could be picked up by the receiver circuitry, creating an error signal at the output of the receiver. The frequency components of the square wave at the transformer secondary are shown in the lower right of the figure, labeled Vsec. Fourier series analysis of the square wave voltage reveals that only odd harmonics are present, and that the amplitude of the harmonics falls off as $1/n$, for n=1,3,5... If this voltage were applied directly to the antenna, the resulting antenna current would have the same harmonics but the amplitude would vary as $1/n^2$, due to the inductive impedance of the antenna, which increases linearly with n (I=V/Z). At the receiver, in formations with low conductivity, the received signal magnitude increases linearly with n. Overall, for the transmitter current decreasing with $1/n^2$ and the received voltage increasing with n, the received voltage magnitude for each harmonic will vary as $1/n$—i.e. the received signal at 1.2 MHz will be ⅓ as large as the received signal at 400 KHz, and the received signal at 2 MHz will be ⅕ as large. This is somewhat undesirable, in that the signal to noise ratio at the receiver antenna for the higher frequencies will be less than the fundamental frequency.

In order to provide equivalent signal to noise ratios at the receiver antenna for all three frequencies, the harmonics of the transmitter current must vary as $1/n$ instead of $1/n^2$. An optional equalization network is shown between the secondary of the transformer T1 and the antenna. The equalization network attenuates the voltage of the first and third harmonics (400 KHz and 1.2 MHz) relative to the fifth harmonic (2 MHz). The spectrum of the output voltage of the equalization network is shown in the lower right of the figure, labeled Vant. The resulting antenna current has the desired $1/n$ falloff with frequency, as shown in the graph labeled Iant. The receiver antenna output voltage spectrum is shown at the bottom, labeled Vrec. The received spectrum has the desired uniform voltage level vs. frequency.

The frequency response of the equalization network resembles a low-Q bandpass filter with a center frequency of 2 MHz. The equalization network is constructed of all passive components (inductors, capacitors, and resistors) rated for the expected voltage and current levels of the application. Using passive components and filter design techniques, the Equalization Network can be designed for minimum power loss, so that the overall efficiency of the transmitter circuit is not significantly affected.

Note that the resulting uniform receiver antenna voltage vs. frequency is true only for very low conductivity environments. As the conductivity increases, the higher frequencies are attenuated significantly more than the lower frequencies. This result is expected and is the basis for the greater sensitivity to formation conductivity for the higher frequency easurements.

A uniform signal to noise ratio for all three frequencies can also be obtained using signal processing techniques in the receiver. Or, the transmitter power may simply be increased to insure an adequate signal to noise level at the higher harmonics. In these cases, the optional equalization network may be omitted.

The connection from the transmitter printed circuit board to the antenna is shown using a shielded twisted pair. The balanced output of the transformer secondary and optional equalization network minimizes crosstalk radiated by the wiring from either the voltage or current delivered to the antenna. Optionally, a small transformer may be incorporated into the transformer winding to further minimize either the voltage or current in the cables. Depending on the turns ratio, the transformer can be used to either step up the voltage or the current directly at the antenna winding. Note, however, that unlike prior art apparatus, the antennas are not tuned, and no tuning capacitors are required. The simple untuned design of the antennas allows them to be used at multiple frequencies.

Receiver Circuit Details—Individual Channel Architectures

The function of the receiver circuit is to determine absolute amplitude and phase measurements of signals received by each of the two receiver antennas. The absolute values for amplitude and phase difference are then used to determine the amplitude ratio (attenuation) and phase difference of the signals from the two antennas. Attenuation and phase difference values are then used to determine resistivity and/or dielectric constant.

FIGS. 9a–9d show various topologies for the Receiver circuit. In each of the topologies shown, the method of synchronous detection is used to determine absolute amplitude and phase of each individual received signal. Multiple samples of an AC waveform are obtained and used for the calculations. By sampling an AC waveform instead of a DC waveform, errors due to DC offsets in the system are eliminated.

The advantages of synchronous detection over previous designs which relied on non-synchronous detection are well known (ref. Meyer, et. al., "Near Bit Propagation Resistivity for Reservoir Navigation", SPE 28318, 1994.) The effective resolution and usable measurement range of the resistivity measurement are limited by the signal to noise ratio of the amplitude and phase measurements. For a given signal level at the receiver antenna, synchronous detection provides a higher signal to noise ratio than non-synchronous detection, and thus a broader usable range. Alternatively, non-synchronous detection requires a higher transmitter power level to achieve the same signal to noise ratio (with corresponding resolution and measurement range) as synchronous detection. In order to implement synchronous detection, the "Convert" command for the Analog to Digital Converter (ADC) must be synchronized with the transmitter waveform. Also, in topologies using a local oscillator, the local oscillator time base must also be synchronized with the transmitter waveform. Circuitry to provide synchronization is located on the processor printed circuit board, to be described later.

Only one receiver coil is shown for each topology. For the second receiver coil, either an identical set of electronics is required, or multiplexing circuitry is used to share some of the receiver circuitry with both receiver antennas.

The selection of the receiver topology is dictated by various requirements or limitations. One limitation may be the overall power or energy available to supply both the transmitter and receiver circuitry, e.g., in a battery-operated system. Another limitation may be physical space available for packaging of the receiver electronics, such as in a small diameter tool. Another limitation may be availability of receiver components which operate at elevated temperature. A requirement may be that all measurements are completed in a minimum amount of time, so that samples of the formation resistivity are separated by no more than some maximum distance when the apparatus is moving at some maximum speed through the borehole. Time required to complete a measurement is particularly critical in wireline measurements, where it is desirable to minimize the time required to evaluate the zones of interest in the well. In all topologies, an RF preamplifier is connected directly to the antenna. The purpose of the RF preamplifier is to amplify the received RF signal while adding minimal additional electrical noise. The gain of the RF preamplifier is high enough to insure that the overall receiver noise performance, as described by the noise factor, is determined primarily by the to noise performance of the RF preamplifier. By maintaining the receiver noise factor close to the ideal value of unity, the required transmitter power may be minimized. The bandwidth of the RF preamplifier is sufficient to amplify the first, third, and fifth harmonic of the fundamental frequency transmitted by the Transmitter antenna (e.g., 400 KHz, 1.2 MHz, and 2 MHz.)

Figure 9A:
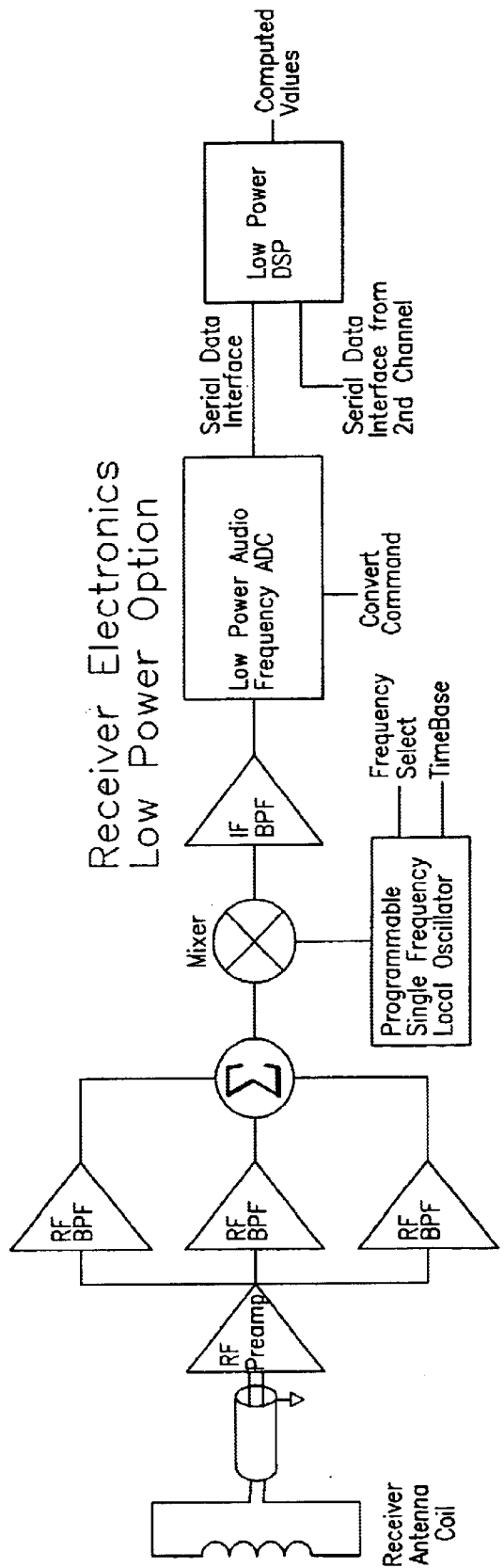
FIGS. 9a–9d show various possible topologies for the receiver electronics.

FIG. 9a shows a receiver topology which makes use of low power components likely to work at elevated temperatures (above 150 deg. C.). As in all other topologies, the signal from the receiver antenna is initially amplified by the low noise RF preamplifier. The output of the RF preamplifier is connected to three RF bandpass filters—each tuned to one of the three transmitted frequencies. The bandwidth of each RF bandpass filters is less than twice the selected IF frequency. The RF bandpass filters provide a 3 dB improvement in signal to noise ratio, when compared to receivers which do not include this feature. These filters may be omitted; however, the signal to noise ratio will be degraded if the transmitted power is not increased. The outputs of the three RF bandpass filters are summed and connected to the input of a mixer circuit. The other input of the mixer is connected to a programmable local oscillator with a single frequency output, such as a direct digital synthesis IC. To implement synchronous detection, the local oscillator frequency must be synchronized with the transmitted waveform and "convert" command to the ADC. The local oscillator time base originates from the same circuitry which provides the transmitter circuitry time base and convert command for the ADC.

The output of the mixer is the product of the two inputs. If the local oscillator is a single frequency, then the output of the mixer will contain frequency components which are the sum and difference frequencies of the two input spectra. For instance, if the local oscillator frequency is 398 KHz, the mixer output will contain components at 2 KHz (400 KHZ–398 KHz) and 798 KHz (400 KHz+398 KHz), as well as the other sum and difference frequencies formed from the 1.2 MHz and 2 MHz received signals. These other sum and difference frequencies will be much higher in frequency than the 2 KHz component. Note that the 2 KHz component retains the phase and amplitude information present in the original 400 KHz received signal.

The output of the mixer is connected to the intermediate frequency (IF) bandpass filter (BPF). The IF BPF passes the 2 KHz component, while rejecting all higher frequency components created by the mixer. The IF BPF also limits the noise bandwidth at the input to the ADC, thereby minimizing noise which may be aliased into the measurement band by the sampling process and maintaining the highest possible signal to noise ratio.

The output of the IF BPF is sampled by the ADC. The sampling rate of the ADC is more than twice the noise bandwidth of the IF BPF, to insure that noise is not aliased into the measurement bandwidth. If the bandwidth of the IF BPF is narrow (say, 200 Hz, or Q=10), then the sample rate of the ADC may be relatively slow (e.g., greater than 400 Hz but less than 1000Hz). Alternatively, as the sample rate of the ADC is increased beyond twice the noise bandwidth of the IF BPF, additional gains in signal to noise ratio are realized, as is described by the following relation:

$$SNR(dB)=6.02b+1.76dB+10\log_{10}(fs/2BW)$$

where b is the number of bits of resolution of the ADC, fs is the sample rate, and 2 BW is twice the bandwidth of the IF BPF. For fs=2BW, there is no gain in the signal to noise ratio. However, as fs is increased above 2BW, the signal to noise ratio also increases. Using this technique, the transmitter power level may be reduced when compared to a system without such gains, and an overall savings in power realized.

The samples of the ADC are transferred serially to the digital signal processor (DSP) IC, which may be located on the Receiver PCB or more likely on the Processor PCB. Serial data from the second receiver channel is also transferred serially to the DSP. The serial interface minimizes the number of connections between the ADC's and DSP, minimizing possible points of failure and also wiring costs. The relatively low sample rate (say, 1–40 KHz), allows the data to be transferred at relatively low serial rates (e.g., less than 1 Mb/sec) from the ADC's to the DSP. The relatively low data rate also allows a slower, lower power DSP to be selected, which further minimizes overall system power requirements. For this topology, a single DSP is adequate to process data from both channels. In fact, it may be possible to perform the processing using some higher performance microcontrollers and to eliminate the DSP IC entirely.

In order to determine amplitude and phase for all three frequencies, the local oscillator frequency is adjusted for either the first, third, or fifth harmonic. For a given input frequency RF1 and intermediate filter center frequency IF, the corresponding local oscillator frequency is given by LO1=RF1−IF. For IF=2 KHz, and RF frequencies at 400 KHz, 1.2 MHz, and 2 MHz, the local oscillator frequencies are 398 KHz, 1.198 MHz, and 1.998 MHz. The amplitude and phase for each RF frequency are determined serially over three measurement intervals, and the transmitter must remain "on" for three times longer than for a single frequency measurement.

Figure 9B:
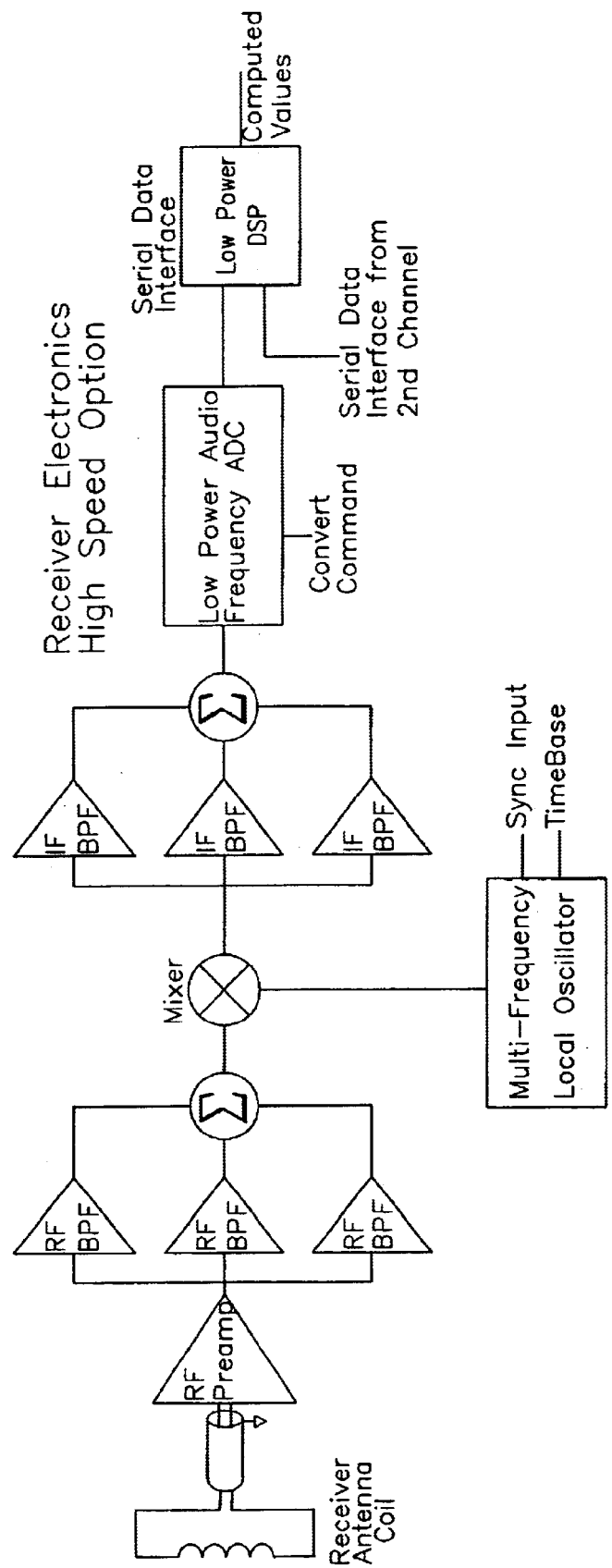

FIG. 9b shows a topology using many of the same components as in FIG. 9a, but configured to allow measurements of all three frequency components simultaneously. As in all other topologies presented, the output of the RF preamplifier contains the three frequencies transmitted simultaneously by the transmitter antenna. The programmable single frequency local oscillator is replaced by a local oscillator capable of generating three frequencies simultaneously, so that all three received RF frequencies can be shifted down to individual intermediate frequencies in the audio band (e.g., less than 10 KHz). For instance, if the multi frequency local oscillator generates 398 KHz, 1.196 MHz, and 1.994 MHz, IF frequencies of 2 KHz, 4 KHz, and 6 KHz will be created from the 400 KHz, 1.2 MHz, and 2 MHz input frequencies, respectively. A single mixer is capable of multiplying several frequencies, so no additional mixers are required. The multi-frequency local oscillator may be realized using several different methods. In one method, three separate direct digital synthesis (DDS) IC's may be configured to generate the three individual local oscillator frequencies, and the outputs summed using either passive or active circuitry. In another configuration, digital samples of a waveform consisting of the combined three frequencies are stored in a memory IC, and converted to an analog waveform using a digital to analog converter (DAC). Control logic must be present to transfer the samples of the waveform from the memory to the DAC. Also, the DAC must be sufficiently high speed to accurately perform the digital to analog conversion at the required frequencies. In all realizations, the output waveform is synchronized with the transmitter and ADC convert command, to enable synchronous detection.

The figure shows three IF bandpass filters, each tuned to one of 2 KHz, 4 KHz, or 6 KHz. Three IF BPF's provide the maximum signal to noise ratio for a given sample rate. The outputs of the three IF BPF's are summed prior to analog to digital conversion. If some noise rejection can be sacrificed, a single low pass filter can be used to reject all higher frequency components after summing the three mixer outputs.

Since all three intermediate frequencies are in the audio band, a low power audio frequency ADC may be used to digitize the samples. As before, the convert command must be synchronous with the transmitter and local oscillator time base to enable synchronous detection. The conversion rate must also be carefully selected to prevent aliasing of one intermediate frequency into another. However, if the conversion rate is properly chosen, the DSP can determine amplitude and phase of all three frequencies simultaneously. This topology requires a somewhat faster DSP than the topology presented in FIG. 9a; however, a low power DSP is still capable of performing the required calculations.

The advantage of the topology of FIG. 9b over that presented in FIG. 9a is a 3×decrease in the time required to acquire measurements at all three frequencies. If the power required by the transmitter is significantly greater than the power required by the receiver, the overall power consumption of the tool may be reduced by using this topology, which reduces the amount of time the transmitter is "on". The disadvantage of FIG. 9b over FIG. 9a is increased parts count in the receiver, with higher power consumption in the receiver. The design of the multi-frequency local oscillator is considerably more complex than the single frequency local oscillator in FIG. 9a.

Figure 9C:
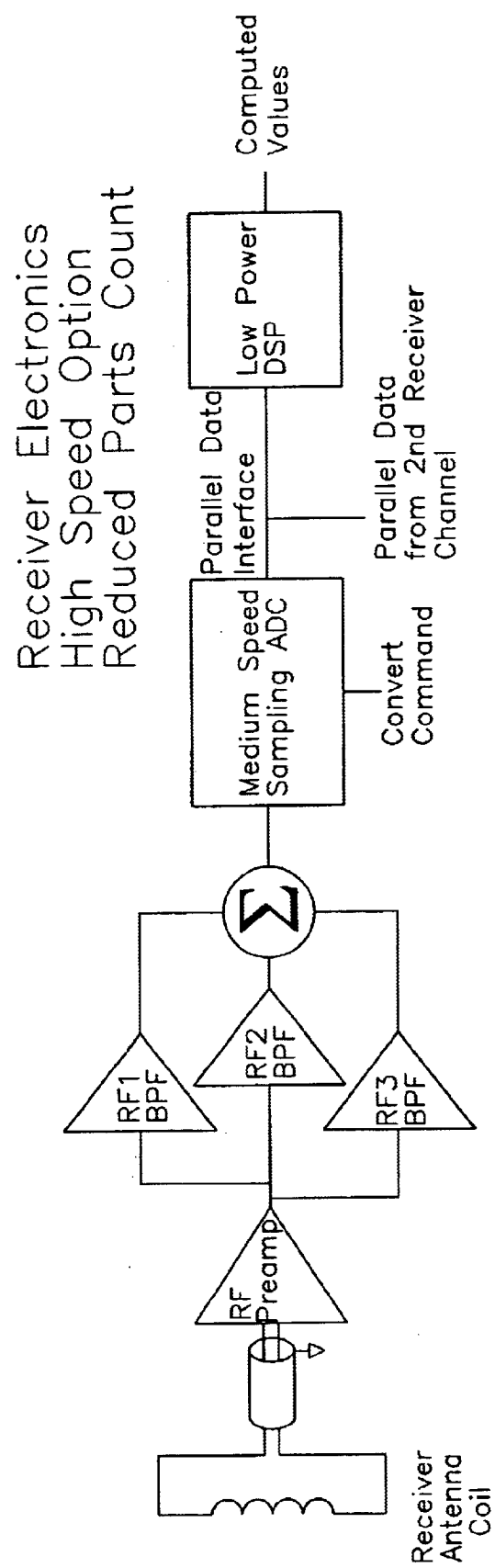

In some applications, the space available for the receiver electronics may be limited. In this instance, it is critical to minimize the size and number of components required for the receiver circuitry. FIG. 9c shows a topology in which the local oscillator circuitry has been eliminated. By eliminating the local oscillator, the topology is similar to the method and apparatus disclosed in U.S. Pat. No. 5,682,099 (Thompson, et al). However, it offers several vantages over this patent. In the topology shown, three individual bandpass filters are tuned to one of the three measurement frequencies, significantly reducing the noise bandwidth prior to digitization. For a filter Q of 20, the resulting bandwidth of the 2 MHz BPF is 100 KHz. The combination of bandpass filters and higher sampling rate significantly improve the noise performance of the measurement when compared to the method and apparatus disclosed in U.S. Pat. No. 5,682,099.

The filtered outputs of the three bandpass filters are summed prior to digitization. By summing the outputs, the DSP may simultaneously calculate amplitude and phase for all three measurement frequencies, which is an additional advantage over the method and apparatus disclosed in U.S. Pat. No. 5,682,099.

As in prior topologies, the conversion rate must be at least twice the noise bandwidth of the input signals. For a 100 KHz noise bandwidth, the conversion rate must be at least 200 KHz. If the Q of the bandpass filters is increased and noise bandwidth further reduced, the conversion rate may be lowered. However, realization of high filter Q's becomes difficult, especially at high temperature.

The ADC required for this topology must be able to sample at rates much higher than the audio frequency ADC's used in the previous topologies (200 KHz vs. 2 KHz) and must also be designed to digitize much higher frequency input signals without distortion or other error (2 MHz vs. 2 KHz). Such ADC's are available, but use more power than audio frequency ADC's and are less likely to work at elevated temperature. Also, due to the higher sample rate, the serial data interface to the DSP may need to be replaced by a parallel data interface. A parallel interface is feasible, but significantly increases the number of connections required between the DSP and ADC. Also, a more powerful DSP will likely be required to handle the additional computing load from both channels.

In general, a tradeoff exists between the operating speed or bandwidth of electronic circuitry and power consumption. The bandwidth and operating speed required for the components used in FIG. 9c is much higher than in topologies using a mixer and audio frequency intermediate frequency. Thus, the overall receiver power is higher. Power dissipation creates a temperature rise internally to the components which adds to the ambient temperature. Higher power designs are less likely to work at elevated ambient temperatures typically found in oil well applications. However, the advantage of the topology of FIG. 9c is the significantly reduced parts count compared to FIGS. 9a and 9b. Also, transmitter duty cycle is minimized by obtaining all three frequencies simultaneously.

Figure 9D:
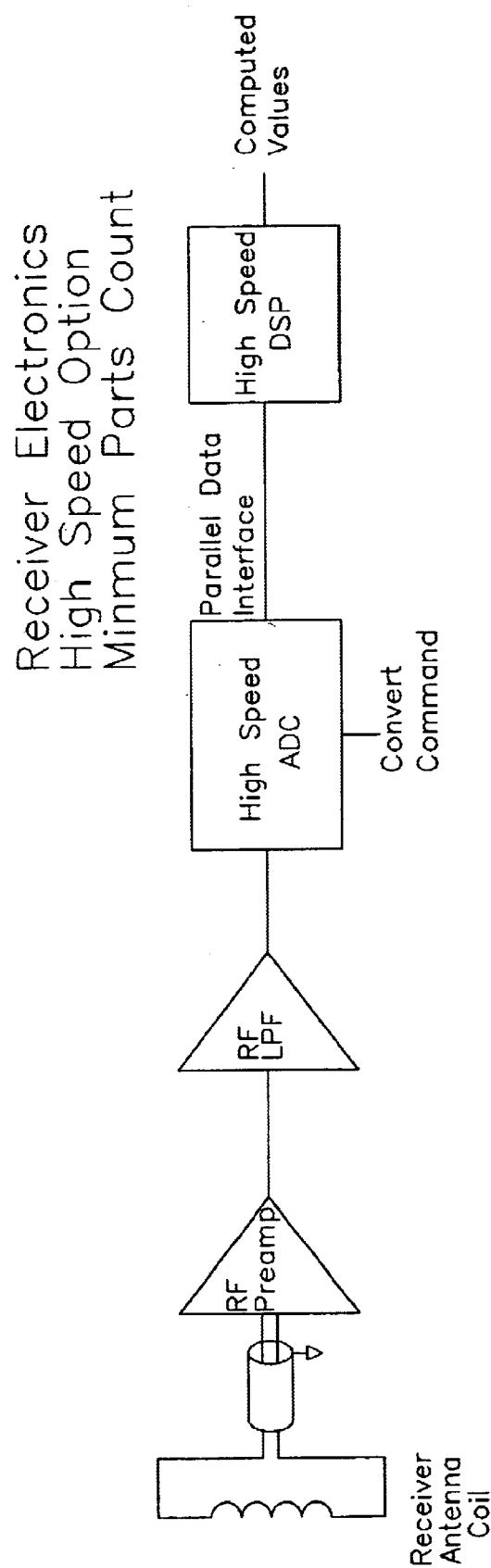

Additional circuitry can be eliminated by using an even faster ADC, capable of sampling at more than twice the highest frequency component received by the receiver antenna. For the highest frequency 2 MHz component, the ADC must sample at a rate of at least 4MHz, and preferably greater. In FIG. 9d, the RF bandpass filters are replaced by a single low pass filter with cutoff frequency at 2 MHz. The ADC must be configured to sample at a rate greater than twice the equivalent noise bandwidth of the low pass filter to prevent aliasing of noise into the measurement.

To support the higher date rate, the interface from the ADC to the DSP must be parallel and high speed. Also, it is likely that a separate high speed DSP will be required for each receiver channel to accommodate the high data rate from the ADC's. The high speed ADC and DSP are expected to consume significantly more power than components selected in the previous topologies. However, the overall parts count is the lowest of all topologies presented. This topology is preferred when available space for the receiver electronics is minimal, system power is adequate to support the higher power receiver components, and the required operating temperature range is moderate. All of the topologies described can be applied to resistivity tools having an unbalanced antenna array, such as one described in U.S. Pat. No. 5,278,507 (Bartel, et al). The advantage of an unbalanced array, with transmitters on one side of the receiver pair only, is that the tool can be reduced in length and manufactured at a lower cost. The disadvantage is that the measurement does not realize the benefits of borehole compensation as described in U.S. Pat. No. 4,899,112 (Clark et al) or electronics compensation as described in U.S. Pat. 5,402,068 (Meador, et al). In the receiver design taught in U.S. Pat. 5,278,507 (Bartel, et al), the measured phase difference and attenuation between the two channels includes the true phase difference and attenuation due to propagation through the formation and also differences in phase shift and gain between the receiver electronics for the two receiver antennas. In a balanced antenna array, differences in phase shift and gain of the electronics cancel when the average of the measurements from the upper and lower transmitters is computed, as disclosed in U.S. Pat. No. 5,402,068 (Meador, et al).

Figure 10:
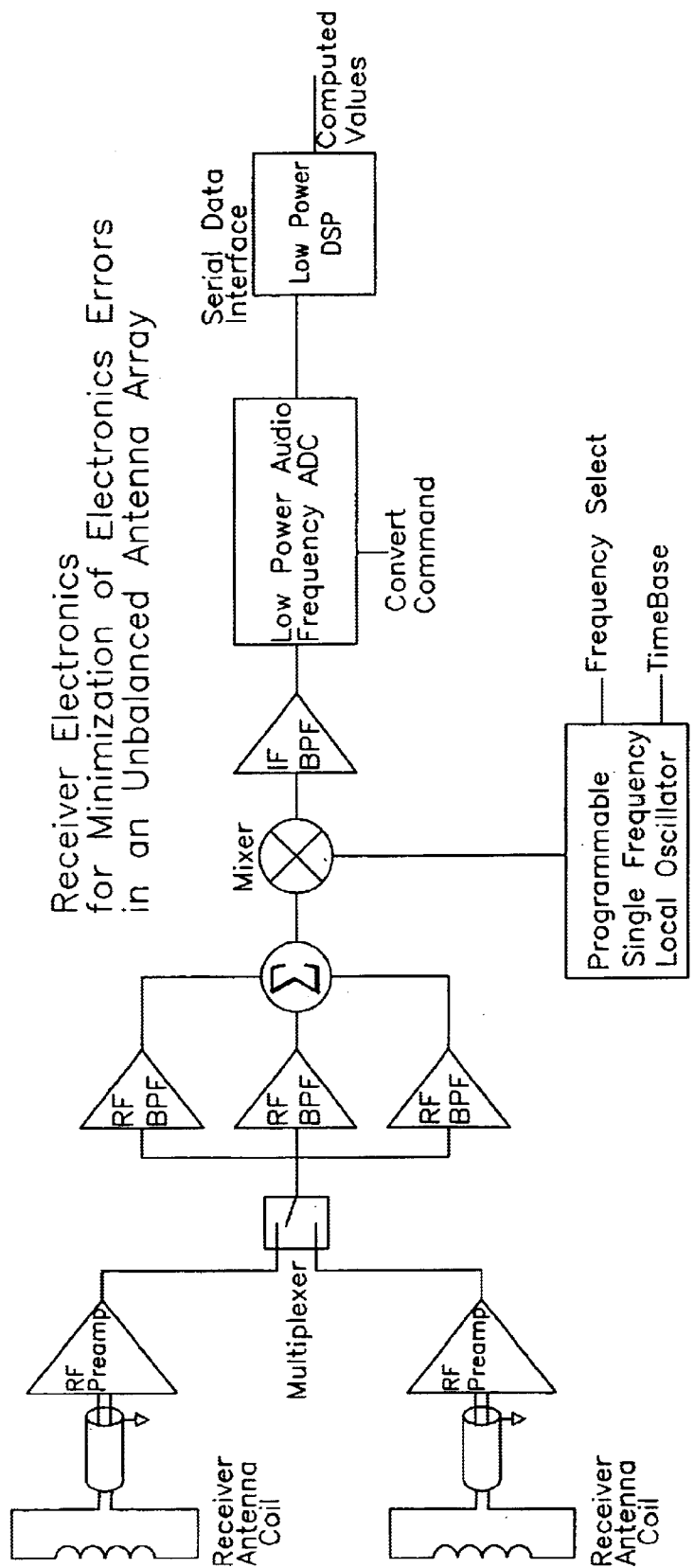
FIG. 10 shows an improved receiver electronics design for systems with an unbalanced antenna array.

FIG. 10 shows a modification to one of the previously presented topologies (FIG. 9a) which minimizes error due to unbalanced phase shift and gain in the receiver electronics channels. The receiver uses digital phase sensitive detection to determine an absolute phase and amplitude measurement for each receiver channel, as in all previous topologies. Digital phase sensitive detection allows the phase difference and attenuation to be computed by the DSP from measurements of the individual channels. An analog multiplexer has been added prior to the mixer. The multiplexer allows both channels to use the same RF bandpass filters, mixer, intermediate frequency bandpass filter, and ADC. During operation, the DSP first determines the absolute phase and amplitude of one receiver channel, and then determines the same measurements for the other channel. The channel to be measured is determined by the multiplexer select input, controlled by the DSP or general purpose microcontroller. The phase shift and gain of the RF bandpass filters, mixer, IF BPF, and ADC is identical for both measurements, since they use the same circuitry. When the phase difference and attenuation are determined from the individual measurements, the phase shift and gain contribution of the shared electronic components cancels out and no error results.

The only phase or gain error remaining from the electronics is due to any residual differences in the RF preamps. These differences may be minimized by component matching during design and manufacture, calibration, and/or characterization vs. temperature. Errors due to the RF preamps are expected to be much smaller than the errors contributed by the filters and amplitude and phase difference measurement circuitry disclosed in U.S. Pat. No. 5,278,507.

Another advantage of the topology shown in FIG. 10 is reduction of the receiver electronics required to make the measurement.

Processor PCB

Figure 11:
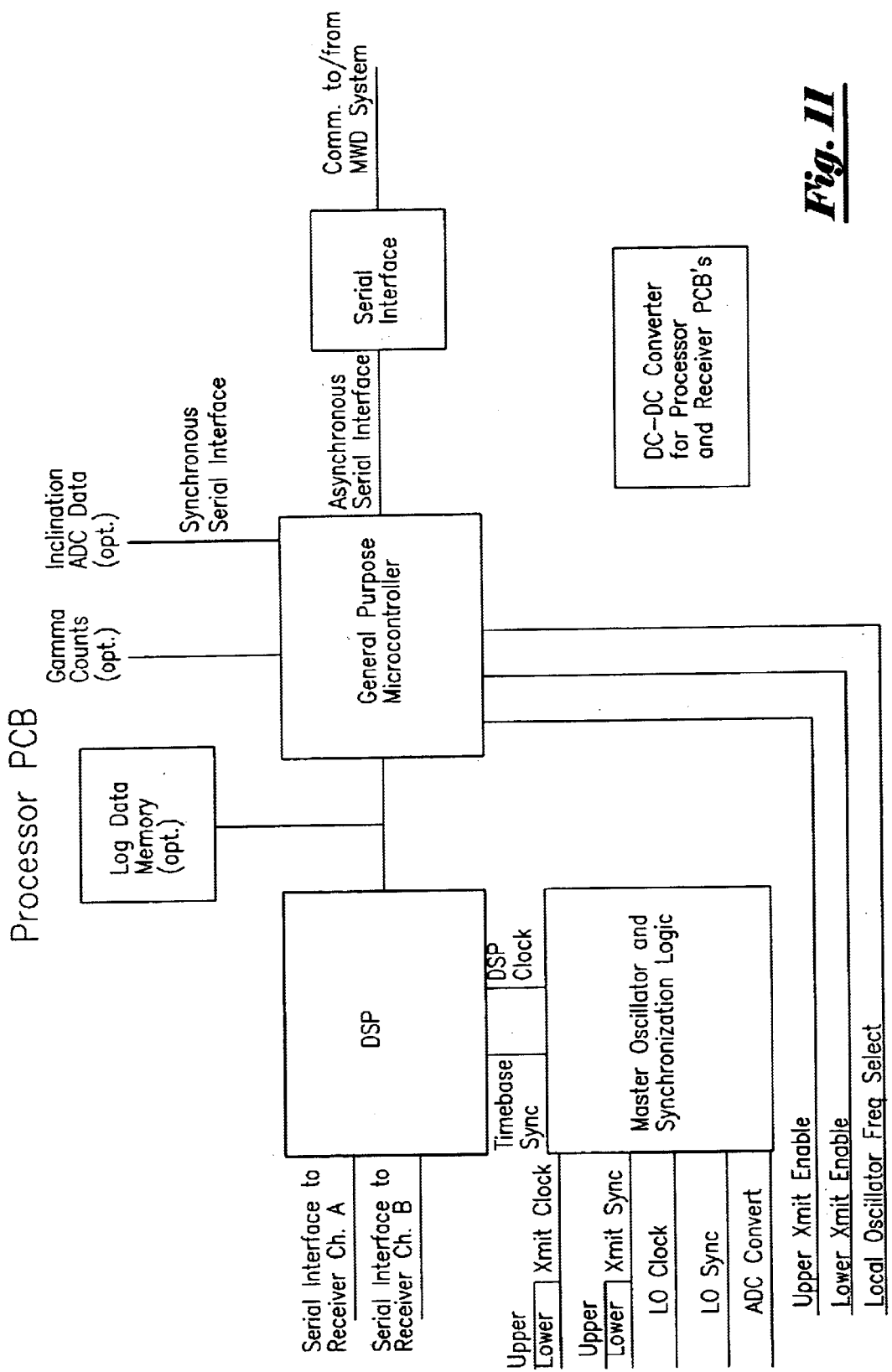
FIG. 11 shows a block diagram of the processor printed circuit assembly.

The DSP previously disclosed in all receiver topologies may be placed on the receiver PCB if space is available, or, more likely, on the processor PCB. In either case, the interface between the receiver and processor PCB is entirely digital. The analog signal from receiver antenna is converted to a digital representation on the receiver PCB. This is a significant advantage in that analog wiring is minimized and noise problems associated with connecting analog signals between boards are avoided. A block diagram of the processor PCB is shown in FIG. 11. In this illustration, a serial interface is shown for the ADCs to the DSP. For other architectures previously described requiring high speed ADCs, a parallel interface may be required.

The DSP is responsible for performing digital phase sensitive detection of the sampled receiver waveform. For phase sensitive detection, the incoming stream of data of frequency $f_c$ is multiplied by $\cos(2\pi f_c t)$ and $\sin(2\pi f_c t)$. This applies for either the case where $f_c$ is an audio band intermediate frequency or where $f_c$ is the RF frequency received by the antenna. For synchronous detection, the DSP must also be synchronized with the timebase used for the transmitter, local oscillator (if present), and ADC convert command. In a typical implementation, the DSP may issue a "sync" logic level pulse from a parallel I/O output which resets and synchronizes the timebase logic. The DSP also initializes the internal cos( ) and sin( ) multiplication functions with the acquisition of the first sample after the "sync" pulse.

The DSP accumulates the product outputs of the cos( ) and sin( ) multiplications for an integer number of cycles of the digitized waveform. The accumulation period determines the final noise bandwidth of the signal, and may be adjusted to obtain the desired signal to noise ratio. The products are designated as the "R"(in phase) and "X" (quadrature) components. For digitized samples of an input waveform with arbitrary amplitude A and phase offset Θ, as described by A cos(2pi $f_c$ t+Θ), the product terms from the multiplication internal to the DSP are $$R = A \cos(2pi f_c t+\Theta)*\cos(2pi f_c t) = A/2[\cos(2pi 2f_c t+\Theta)+\cos(-\Theta)]$$

$$X = A \cos(2pi f_c t+\Theta)*\sin(2pi f_c t) = A/2[\sin(2pi 2f_c t+\Theta)+\sin(-\Theta)]$$

If the outputs of the multiplication process are accumulated for an integer number of cycles of Acos(2pi $f_c$ t+Θ)), the higher frequency component averages to zero and R and X simplify to $$R = A/2 \cos(-\Theta)$$

$$X = A/2 \sin(-\Theta)$$

From the R and X components, the amplitude and phase can be determined $$\text{Amplitude} = 2*\text{sqrt}(R^2+X^2) = A$$

$$\text{Phase} = \arctan(-X/R) = \Theta$$

Some additional scaling is required to normalize the amplitude value for the duration of the accumulation period.

When the amplitude of the signal is small, the phase measurement can become noisy due to the sensitivity of the arctan function to changes in R and X. Noise in the measurement results in random fluctuations in the X and R component. The derivatives of the arctan function to changes in X and R are given by $$d(\arctan(X/R)/dX = R/(R^2+X^2)$$

$$d(\arctan(X/R)/dR = -R/(R^2+X^2)$$

To minimize the effect of noise on the arctan measurement, it is desirable to make the denominator tern $(R^2+X^2)$ in the derivatives large compared to the numerator (R). The denominator term does not depend on the value of Θ, since it may be recognized as simply the square of the magnitude of the signal. The R term can vary from zero for Θ=pi/2, or can equal the magnitude of the signal for Θ=0. The derivative is largest for Θ=0, where it is equal to 1/R, which for this special case also equals 1/sqrt($R^2+X^2$), or 1/(signal magnitude).

Recall that the values for R and X are the result of accumulation of the output of the digital phase sensitive detection multiplications. If the accumulation period is adjustable, then the values accumulated for R and X can be used to insure that the worst case derivative for the arctan calculation 1/sqrt($R^2+X^2$) is below some arbitrary threshold. In formations with high resistivity, the signal magnitude is high and the transmitter can be turned off after a brief accumulation period to conserve power. In formations with low resistivity, the transmitter can be left on for a longer period of time until the accumulated signal magnitude sqrt($R^2+X^2$) is greater than some threshold, to insure that the phase measurement is not overly affected by small fluctuations in R or X.

After determination of amplitude and phase for the individual received signals and also phase difference and attenuation for both channels, the DSP may transfer the values to the general purpose microcontroller or perform additional processing. Either the DSP or microcontroller may transform the phase difference and attenuation data to resistivity values, using a table look-up algorithm, polynomial fit, or other common method of transforming data. In addition, either the DSP or microcontroller may also simultaneously solve for both resistivity and dielectric constant, using similar methods.

The microcontroller is responsible for asynchronous communications with the remainder of the downhole MWD system, as well as other functions which are better suited to its general purpose architecture. The processor PCB may include an optional log data memory, in which log data is stored. The log data is time stamped, using time information from a real-time clock implemented by the microcontroller's software. When recovered at the surface, the time stamped downhole data is combined with time stamped depth data from the surface computing system to create a data log vs. depth.

The log data memory may be elsewhere in the MWD tool system. In this case, the microcontroller sends requested data to the MWD system via an asynchronous serial communications interface. The microcontroller may also send and receive other data and commands. The built-in asynchronous serial interface (UART) of the microcontroller significantly simplifies the design and operation of the DSP software, as compared to a design which uses only a DSP for all functionality.

The microcontroller is also responsible for high level timing and control of the resistivity data acquisition. The microcontroller selects either upper or lower transmitter in systems with both, and also selects the frequency to be measured for receiver architectures which are capable of measuring only one frequency component at a time. The frequency to be measured is selected by programming the local oscillator to the corresponding local oscillator frequency.

The microcontroller is also capable of acquiring data at low rates and performing simple processing for measurements other than resistivity. For example, a gamma ray detector with pulse output may be added to the tool, and the microcontroller used to determine the count rate in counts/second and send the data to the MWD system. Likewise, data from ADC's which measure the output of accelerometers used for inclination measurements or magnetometers used for azimuth or RPM measurements can be acquired by the microcontroller through a common synchronous serial interface. The microcontroller has adequate computing power to perform inclination, azimuth, or RPM calculations and transfer the data when requested to the MWD system. The advantage of this implementation is that the gamma, inclination, and other sensors may share the microcontroller with the resistivity measurement, minimizing overall system electronics.

A crystal oscillator and logic for maintaining synchronization of the transmitter, local oscillator (if present), ADC convert command, and DSP are also present on the Processor board. This logic generates a clock frequency for the transmitter PCBs which is higher than any of the measurement frequencies received by the receiver PCB. Using a higher frequency for the transmitter clock eliminates interference with the receiver signal due to crosstalk from coherent signals elsewhere in the system at the measurement frequency.

A "sync" pulse is also generated for the transmitters which resets logic and dividers on the transmitter board, so that the transmitter antenna waveform will be synchronous with the remainder of the system. The logic also generates a clock and sync pulse for the Local Oscillator (if present), so that the Local Oscillator waveform will also be synchronized with the remainder of the system. Finally, the logic generates the ADC Convert command, which initiates conversion of the receiver ADC's.

The crystal oscillator may also be used to clock the DSP IC. At the beginning of a new measurement, the DSP generates a "Sync" command to the sync logic, which in turn resets & synchronizes all logic for the transmitters, local oscillator, and ADCs. This insures that the digital phase sensitive detection performed by the DSP begins with known, repeatable phase relations between the transmitter, local oscillator, and ADC convert commands.

A DC-DC converter is also present on the processor PCB to generate power supply voltages for the receiver and processor PCB from the system power bus. The DC-DC converter is located on the processor board to somewhat isolate it physically from the Receiver board, so that radiated switching noise generated from the DC-DC converter does not interfere or add noise to the received signals. The DC-DC converter may include special circuitry such as additional differential mode or common mode filters to minimize ripple and noise at the switching frequency, also to avoid interference with the received signal. The DC-DC converter may also be used to power optional measurements such as a gamma ray preamp-discriminator or inclination and magnetometer circuitry.

While many specifics have been given in the above description, same are presented only to set forth some of the presently preferred embodiments of the present invention, and not by way of limitation. Those having ordinary skill in the relevant art field will recognize that various changes may be made to the exemplary embodiments without departing from the spirit of the invention.

Therefore, the scope of the invention is to be limited not by the preceding description, but by the appended claims and their legal equivalents.

I claim:

1. A measurement while drilling apparatus for determining resistivity of formations surrounding a borehole at multiple radial depths, comprising:
   a) an elongated housing comprising a first transmitter antenna and first and second receiver antennas mounted thereon, said first and second receiver antennas spaced apart from one another and spaced apart from said first transmitter antenna, and wherein said transmitter and receiver antennas comprise untuned antennas adapted to transmit and receive electromagnetic energy simultaneously at multiple frequencies;
   b) means for generating a multiple frequency electromagnetic energy waveform coupled to said first transmitter antenna, said waveform comprising a fundamental frequency element and at least two higher frequency harmonics of said fundamental frequency element;
   c) means for processing reflections of said electromagnetic energy waveform detected by said first and second receiver antennas at said fundamental frequency and said harmonic frequencies, coupled to said first and second receiver antennas, and for generating a digitized output signal therefrom for each of said frequencies; and
   d) means for receiving said output signals and for determining a phase difference between said signals detected at said first and second receiver antennas at each of said frequencies, and for determining formation resistivity at each of said detected frequencies as a function of only said determined phase difference, thereby determining formation resistivity at multiple distances from said borehole.

2. The apparatus of claim 1, wherein said means for generating a multiple frequency electromagnetic energy waveform comprises a switchmode circuit.

3. The apparatus of claim 1, wherein said means for processing reflections of said electromagnetic energy waveform comprises a radio frequency preamplifier coupled to said receiver antenna, and at least one radio frequency band pass filter coupled to said preamplifier.

4. The apparatus of claim 3, wherein said at least one radio frequency band pass filter comprises three radio frequency bandpass filters, each of said three radio frequency bandpass filters tuned to one of the transmitted frequencies.

5. The apparatus of claim 4, wherein said means for processing reflections of said electromagnetic energy waveform further comprises a single frequency local oscillator coupled to a mixer, with an output of said mixer coupled to an intermediate frequency bandpass filter, and wherein each of said three radio frequency bandpass filters has a bandwidth less than twice the frequency of said intermediate frequency band pass filter.

6. The apparatus of claim 5, further comprising an analog to digital converter adapted to sample data signals at rates greater than twice the bandwidth of said intermediate frequency bandpass filter and to digitize signals at frequencies in the audio frequency range or higher.

7. The apparatus of claim 4, wherein said means for processing reflections of said electromagnetic energy waveform further comprises a multiple frequency local oscillator coupled to a mixer, with an output of said mixer coupled to three intermediate band pass filters.

8. The apparatus of claim 4, further comprising an analog multiplexer coupled between said radio frequency preamplifier and said three radio frequency band pass filters, such that said analog multiplexer selects an input signal from one of two radio frequency preamplifiers connected to said receiver antennas.

9. The apparatus of claim 3, further comprising a radio frequency low pass filter having a cutoff frequency of about 2 MHz or higher, and further comprising an analog to digital converter adapted to sample data signals at rates of twice the bandwidth of said radio frequency low pass filter or faster.

10. The apparatus of claim 1, wherein said means for receiving said output signals and for determining a phase difference between said signals detected at said first and second receiver antennas at each of said frequencies comprises a digital signal processor adapted to determine the variables $R = ((\text{signal amplitude})/2) \cos(-\text{phase offset}))$, and $X = ((\text{signal amplitude})/2) \sin(-\text{phase offset}))$, and phase offset = $\arctan(-X/R)$, and adapted to adjust the period of accumulation of R and X to achieve a desired minimum value for the sum $(R^2 + X^2)$.

11. The apparatus of claim 1, wherein said first transmitter antenna and first and second receiver antennas are on a substantially common axis.

12. The apparatus of claim 11, further comprising:
   a) a second transmitter antenna mounted in said housing on said substantially common axis such that said first and second receiver antennas are between said first and second transmitter antennas;
   b) means for generating a multiple frequency electromagnetic energy waveform coupled to said second transmitter antenna, said waveform comprising a fundamental frequency element and at least two higher frequency harmonics of said fundamental frequency element,
and wherein said first and second receiver antennas additionally detect reflections of electromagnetic energy emitted from said second transmitter antenna for processing.

13. The apparatus of claim 12, wherein said means for generating a multiple frequency electromagnetic energy waveform comprises a switchmode circuit.

14. The apparatus of claim 12, wherein said means for processing reflections of said electromagnetic energy waveform comprises a radio frequency preamplifier coupled to said receiver antenna, and at least one radio frequency band pass filter coupled to said preamplifier.

15. The apparatus of claim 14, wherein said at least one radio frequency band pass filter comprises three radio frequency bandpass filters, each of said three radio frequency bandpass filters tuned to one of the transmitted frequencies.

16. The apparatus of claim 15, wherein said means for processing reflections of said electromagnetic energy waveform further comprises a single frequency local oscillator coupled to a mixer, with an output of said mixer coupled to an intermediate frequency band pass filter, and wherein each of said three radio frequency bandpass filters has a bandwidth less than twice the frequency of said intermediate band pass filter.

17. The apparatus of claim 16, further comprising an analog to digital converter adapted to sample data signals at rates greater than twice the bandwidth of said intermediate frequency bandpass filter and to digitize signals at frequencies in the audio frequency range or higher.

18. The apparatus of claim 15, wherein said means for processing reflections of said electromagnetic energy waveform further comprises a multiple frequency local oscillator coupled to a mixer, with an output of said mixer coupled to three intermediate band pass filters.

19. The apparatus of claim 14, further comprising a radio frequency low pass filter having a cutoff frequency of about 2 MHz or higher, and further comprising an analog to digital converter adapted to sample data signals at rates of twice the bandwidth of said radio frequency low pass filter or faster.

20. The apparatus of claim 12, wherein said means for receiving said output signals and for determining a phase difference between said signals detected at said first and second receiver antennas at each of said frequencies comprises a digital signal processor adapted to determine the variables $R=((\text{signal amplitude})/2) \cos (-\text{phase offset}))$, and $X=((\text{signal amplitude})/2) \sin (-\text{phase offset}))$, and phase offset=arctan $(-X/R)$,
and adapted to adjust the period of accumulation of R and X to achieve a desired minimum and adapted to adjust the period of accumulation of R and X to achieve a desired minimum value for the sum $(R^2+X^2)$.

21. The apparatus of claim 12, wherein said means for receiving said output signals further comprises a means for determining an attenuation between said reflections detected at said first and second receiver antennas at each of said frequencies, and determining a formation dielectric constant at each of said detected frequencies as a function of said determined phase difference and said attenuation.

22. The apparatus of claim 1, wherein said means for receiving said output signals further comprises a means for determining an attenuation between said reflections detected at said first and second receiver antennas at each of said frequencies, and determining a formation dielectric constant at each of said detected frequencies as a function of said determined phase difference and said attenuation.

23. The apparatus of claim 1, further comprising a gamma radiation sensor and means for processing a signal received from said sensor to determine a gamma radiation value of a formation.

24. The apparatus of claim 23, further comprising an inclination sensor and means for processing a signal received from said sensor to determine an inclination of said housing.

25. An apparatus for multiple depth of investigation formation resistivity measurement, comprising:
   a) an elongated housing comprising a first transmitter antenna and first and second receiver antennas mounted thereon, said first and second receiver antennas spaced apart from one another and spaced apart from said first transmitter antenna, and wherein said transmitter and receiver antennas comprise untuned antennas adapted to transmit and receive electromagnetic energy simultaneously at multiple frequencies;
   b) a multiple frequency electromagnetic energy waveform generator coupled to said first transmitter antenna, said waveform comprising a fundamental frequency element and at least two higher frequency harmonics of said fundamental frequency element;
   c) a receiver circuit coupled to said first and second receiver antennas and adapted to process reflections of said electromagnetic energy waveform detected by said first and second receiver antennas at said fundamental frequency and said harmonic frequencies, and to generate a digitized output signal therefrom for each of said frequencies; and
   d) a digital signal processor receiving said output signals and determining a phase difference between said signals detected at said first and second receiver antennas at each of said frequencies, said digital signal processor further determining formation resistivity at each of said detected frequencies as a function of only said determined phase difference, thereby determining formation resistivity at multiple distances from said borehole.

26. The apparatus of claim 25, wherein said multiple frequency electromagnetic energy waveform generator comprises a switchmode circuit.

27. The apparatus of claim 25, wherein said receiver circuit coupled to said first and second receiver antennas comprises a radio frequency preamplifier coupled to said receiver antenna, and at least one radio frequency band pass filter coupled to said preamplifier.

28. The apparatus of claim 27, wherein said at least one radio frequency band pass filter comprises three radio frequency bandpass filters, each of said three radio frequency bandpass filters tuned to one of the transmitted frequencies.

29. The apparatus of claim 28, wherein said receiver circuit coupled to said first and second receiver antennas further comprises a single frequency local oscillator coupled to a mixer, with an output of said mixer coupled to an intermediate frequency bandpass filter, and wherein each of said three radio frequency bandpass filters has a bandwidth less than twice the frequency of said intermediate frequency bandpass filter.

30. The apparatus of claim 29, further comprising an analog to digital converter adapted to sample data signals at rates greater than twice the bandwidth of said intermediate frequency bandpass filter and to digitize signals at frequencies in the audio frequency range or higher.

31. The apparatus of claim 28, wherein said receiver circuit coupled to said first and second receiver antennas further comprises a multiple frequency local oscillator coupled to a mixer, with an output of said mixer coupled to three intermediate band pass filters.

32. The apparatus of claim 28, further comprising an analog multiplexer coupled between said radio frequency preamplifier and said three radio frequency band pass filters, such that said analog multiplexer selects an input signal from one of two radio frequency preamplifiers connected to said receiver antennas.

33. The apparatus of claim 27, further comprising a radio frequency low pass filter having a cutoff frequency of about 2 MHz or higher, and further comprising an analog to digital converter adapted to sample data signals at rates of twice the bandwidth of said radio frequency lowpass filter or faster.

34. The apparatus of claim 25, wherein said digital signal processor is adapted to determine the variables $R=((\text{signal amplitude})/2) \cos (-\text{phase offset}))$, and $X=((\text{signal amplitude})/2) \sin (-\text{phase offset}))$, and phase offset=arctan $(-X/R)$,
and adapted to adjust the period of accumulation of R and X to achieve a desired minimum value for the sum $(R^2+X^2)$.

35. The apparatus of claim 25, wherein said first transmitter antenna and first and second receiver antennas are on a substantially common axis.

36. The apparatus of claim 35, further comprising a gamma radiation sensor and means for processing a signal receiver from said sensor to determine a gamma radiation value of a attenuation.

37. The apparatus of claim 36, further comprising a inclination sensor and means for processing a signal received from said sensor to determine an inclination of said housing.

38. The apparatus of claim 36, further comprising:
   a) a second transmitter antenna mounted in said housing on said substantially common axis such that said first and second receiver antennas are between said first and second transmitter antennas;
   b) a multiple frequency electromagnetic energy waveform generator coupled to said second transmitter antenna, said waveform comprising a fundamental frequency element and at least two higher frequency harmonics of said fundamental frequency element,
and wherein said first and second receiver antennas additionally detect reflections of electromagnetic energy emitted from said second transmitter antenna for processing.

39. The apparatus of claim 38, wherein said multiple frequency electromagnetic energy waveform generator comprises a switchmode circuit.

40. The apparatus of claim 38, wherein said receiver circuit coupled to said first and second receiver antennas comprises a radio frequency preamplifier coupled to said receiver antenna, and at least one radio frequency band pass filter coupled to said preamplifier.

41. The apparatus of claim 40, wherein said at least one radio frequency band pass filter comprises three radio frequency bandpass filters, each of said three radio frequency bandpass filters tuned to one of the transmitted frequencies.

42. The apparatus of claim 41, wherein said receiver circuit coupled to said first and second receiver antennas further comprises a single frequency local oscillator coupled to a mixer, with an output of said mixer coupled to an intermediate frequency band pass filter, and wherein each of said three radio frequency bandpass filters has a bandwidth less than twice the frequency of said intermediate frequency band pass filter.

43. The apparatus of claim 42, further comprising an analog to digital converter adapted to sample data signals at rates of greater than twice the bandwidth of said intermediate frequency bandpass filter and to digitize signals at frequencies in the audio frequency range or higher.

44. The apparatus of claim 41, wherein said receiver circuit coupled to said first and second receiver antennas further comprises a multiple frequency local oscillator coupled to a mixer, with an output of said mixer coupled to three intermediate frequency band pass filters.

45. The apparatus of claim 40, further comprising a radio frequency low pass filter having a cutoff frequency of about 2 MHz or higher, and further comprising an analog to digital converter adapted to sample data signals at rates of twice the bandwidth of said radio frequency low pass filter or faster.

46. The apparatus of claim 38, wherein said digital signal processor receiving said output signals and determining a phase difference between said signals is adapted to determine the variables $R=((\text{signal amplitude})/2) \cos (-\text{phase offset}))$, and $X=((\text{signal amplitude})/2) \sin (-\text{phase offset}))$, and phase offset=arctan $(-X/R)$,
and adapted to adjust the period of accumulation of R and X to achieve a desired minimum value for the sum $(R^2+X^2)$.

47. The apparatus of claim 36, wherein said digital signal processor is further adapted to determine an attenuation between said reflections detected at said first and second receiver antennas at each of said frequencies, and to determine a formation dielectric constant at each of said detected frequencies as a function of said determined phase difference and said attenuation.

48. The apparatus of claim 25, wherein said digital signal processor is adapted to determine an attenuation between said reflections detected at said first and second receiver antennas at each of said frequencies, and to determine a formation dielectric constant at each of said detected frequencies as a function of said determined phase difference and said attenuation.

49. A method for determining formation resistivity at three or more depths radially from a borehole, comprising the steps of:
   a) providing a measurement while drilling tool comprising:
      i) an elongated housing comprising a first transmitter antenna and first and second receiver antennas mounted thereon, said first and second receiver antennas spaced apart from one another and spaced apart from said first transmitter antenna, and wherein said transmitter and receiver antennas comprise untuned antennas adapted to transmit and receive electromagnetic energy simultaneously at multiple frequencies;
      ii) a multiple frequency electromagnetic energy waveform generator coupled to said first transmitter antenna, said waveform comprising a fundamental frequency element and at least two higher frequency harmonics of said fundamental frequency element;
      iii) receiver circuits adapted to receive signals from said first and second receiver antennas caused by reflections of said electromagnetic energy waveform detected thereby at said fundamental frequency and said harmonic frequencies, coupled to said first and second receiver antennas, and for generating a digitized output signal therefrom for each of said frequencies; and iv) a digital signal processor for receiving said output signals and for determining a phase difference between said signals detected at said first and second receiver antennas at each of said frequencies, and for determining formation resistivity at each of said detected frequencies as a function of only said determined phase difference, b) generating a multiple frequency electromagnetic energy waveform generator from said first transmitter antenna, said waveform comprising a fundamental frequency element and at least two higher frequency harmonics of said fundamental frequency element;

c) detecting signals from said first and second receiver antennas caused by reflections of said electromagnetic energy waveform detected thereby at said fundamental frequency and said harmonic frequencies;

d) generating a digitized output signal for each of said frequencies;

e) determining a phase difference between said signals at each of said frequencies, and determining formation resistivity at each of said detected frequencies as a function of only said determined phase difference.

* * * * *